United States Patent
Sato et al.

(10) Patent No.: US 10,563,060 B2
(45) Date of Patent: Feb. 18, 2020

(54) THERMOPLASTIC RESIN COMPOSITION, AND MOLDED PRODUCT AND METHOD FOR PRODUCING SAME

(71) Applicant: Asahi Kasei Kabushiki Kaisha, Tokyo (JP)

(72) Inventors: Naohiko Sato, Tokyo (JP); Yoshifumi Araki, Tokyo (JP)

(73) Assignee: Asahi Kasei Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/120,164

(22) PCT Filed: Feb. 13, 2015

(86) PCT No.: PCT/JP2015/053987
§ 371 (c)(1),
(2) Date: Aug. 19, 2016

(87) PCT Pub. No.: WO2015/125707
PCT Pub. Date: Aug. 27, 2015

(65) Prior Publication Data
US 2017/0058117 A1 Mar. 2, 2017

(30) Foreign Application Priority Data

Feb. 20, 2014 (JP) ................ 2014-030861
Feb. 20, 2014 (JP) ................ 2014-030864

(51) Int. Cl.
| | | |
|---|---|---|
| *C08L 53/02* | (2006.01) | |
| *C08F 297/04* | (2006.01) | |
| *B29C 45/00* | (2006.01) | |
| *C08L 25/12* | (2006.01) | |
| *B29K 101/10* | (2006.01) | |

(52) U.S. Cl.
CPC .......... *C08L 53/02* (2013.01); *B29C 45/0046* (2013.01); *C08F 297/04* (2013.01); *C08L 25/12* (2013.01); *B29K 2101/10* (2013.01)

(58) Field of Classification Search
CPC ................ C08L 53/02; C08L 25/12
See application file for complete search history.

(56) References Cited

U.S. PATENT DOCUMENTS

| | | | | | |
|---|---|---|---|---|---|
| 4,442,273 | A | * | 4/1984 | Neiditch | ......... B01J 19/006 422/134 |
| 4,677,171 | A | * | 6/1987 | Morris | ......... B01J 19/0013 526/68 |
| 5,296,273 | A | * | 3/1994 | Abe | ......... B05D 3/063 427/393.5 |
| 2005/0075455 | A1 | | 4/2005 | Chang et al. | |
| 2008/0118750 | A1 | | 5/2008 | Sasagawa et al. | |
| 2008/0281012 | A1 | * | 11/2008 | Van Horn | ......... C08F 293/005 521/139 |
| 2009/0061248 | A1 | | 3/2009 | Hoshi et al. | |
| 2009/0088526 | A1 | * | 4/2009 | Gervat | ......... C08L 25/12 525/71 |
| 2009/0124750 | A1 | * | 5/2009 | Hong | ......... C08L 25/14 524/505 |
| 2011/0020575 | A1 | * | 1/2011 | Knoll | ......... C08F 297/02 428/36.9 |
| 2011/0040035 | A1 | | 2/2011 | Shields et al. | |
| 2015/0165389 | A1 | * | 6/2015 | McGinniss | ......... B01D 61/002 523/457 |

FOREIGN PATENT DOCUMENTS

| | | |
|---|---|---|
| CN | 1822948 A | 8/2006 |
| CN | 101287793 A | 10/2008 |
| JP | H05-186660 A | 7/1993 |
| JP | H05-279543 A | 10/1993 |
| JP | H06-192493 A | 7/1994 |
| JP | H07-097493 A | 4/1995 |
| JP | H08-092385 A | 4/1996 |
| JP | H08-193161 A | 7/1996 |
| JP | H10-067901 A | 3/1998 |
| JP | H10-139962 A | 5/1998 |
| JP | 2000-186177 A | 7/2000 |
| JP | 2003-213071 A | 7/2003 |
| JP | 2005-105032 A | 4/2005 |
| JP | 2005-105280 A | 4/2005 |
| JP | 2005-154753 A | 6/2005 |
| JP | 2008-274215 A | 11/2008 |
| KR | 2007-0117643 A | 12/2007 |

OTHER PUBLICATIONS

Supplementary European Search Report issued in counterpart European Patent Application No. 15752123.8 dated Dec. 20, 2016.
International Preliminary Report on Patentability and Written Opinion issued in corresponding International Patent Application No. PCT/JP2015/053987 dated Aug. 23, 2016.
International Search Report issued in corresponding International Patent Application No. PCT/JP2015/053987 dated Apr. 21, 2015.

* cited by examiner

*Primary Examiner* — Jeffrey C Mullis
(74) *Attorney, Agent, or Firm* — Morgan, Lewis & Bockius LLP

(57) ABSTRACT

A thermoplastic resin composition comprising:
a block copolymer (a) having 60 to 80% by mass of a vinyl aromatic monomer unit and 40 to 20% by mass of a conjugated diene monomer unit; and
a copolymer (b) having 60 to 90% by mass of a vinyl aromatic monomer unit and 40 to 10% by mass of an unsaturated nitrile monomer unit, wherein
the block copolymer (a) has at least one polymer block (S) primarily having a vinyl aromatic monomer unit,
the block copolymer (a) has at least one tan δ peak of dynamic viscoelasticity at a temperature in a range of −73 to −10° C., and
a mass ratio (a)/(b) of the block copolymer (a) to the copolymer (b) is 1/99 to 80/20.

10 Claims, No Drawings

THERMOPLASTIC RESIN COMPOSITION, AND MOLDED PRODUCT AND METHOD FOR PRODUCING SAME

TECHNICAL FIELD

The present invention relates to a thermoplastic resin composition, and a molded product and a method for producing the same.

BACKGROUND ART

Styrene-butadiene copolymer resins (hereinafter, also referred to as "SBC resin") have high flexibility due to a butadiene rubber component contained therein and in addition have excellent transparency and processability, and by virtue of the features, they have been conventionally used for a wide variety of applications such as packaging materials for food, packaging materials for electronic parts, blister packages, and toys.

Although an SBC resin may be used singly in these applications, it is more common that an SBC resin is used in a blend with a styrene homopolymer resin (GPPS), a polystyrene resin such as an high impact polystyrene (HIPS), or a styrene-alkyl (meth)acrylate copolymer resin. The reason is, for example, that such blending facilitates control of balance between impact resistance and stiffness and balance between mechanical characteristics and economic efficiency in the material design. Specifically, it is only required to prepare two starting materials of an SBC resin and a polystyrene resin and adjust the blending ratio between them to better meet the properties of a product, and moreover a wide variety of materials can be produced in accordance with an object.

For example, Patent Literature 1 discloses a composition containing an SBC resin and a polystyrene resin.

There exist various methods for molding a thermoplastic resin, and typical representatives thereof are injection molding and extrusion molding. Molding machines for them generally include a screw. Functions required for the screw include "transporting (conveying)", "melting (fusing)", and "kneading (dispersing)" a thermoplastic resin. In particular, a T-die extruder in extrusion molding and a twin-screw extruder for the purpose of kneading (compounding), and the like use a screw designed to be capable of "transporting (conveying)", "melting (fusing)", and "kneading (dispersing)" in accordance with a thermoplastic resin to be used and the object.

In contrast, a general-purpose screw designed to have a function primarily for melting/plasticizing of a thermoplastic resin is used for a screw for an injection molding machine, and the screw in fact only has abilities to "transport (convey)" and "melt (fuse)", without an ability to "knead (disperse)" in many cases.

However, the number of applications involving improvement of physical properties, such as polymer blending, is increasing in association with the recent diversification of applications of resin products, and cost reduction with use of an injection molding machine in combination with maintaining high quality for a resin product is increasingly required year by year also for thermoplastic resins.

Thus, when an injection-molded product is produced from a composition containing an SBC resin, a styrene resin, and the like, a pellet of a blended composition of an SBC resin, a styrene resin, and the like, is temporally produced by using extrusion molding, and thereafter injection molding is carried out to fabricate a resin product, as a result of which two molding steps which have an influence on thermal history are required. On the other hand, direct fabrication of a resin product by using injection molding of a dry blend of an SBC resin and a styrene resin, without the step of producing a pellet of a blended composition of an SBC resin and a styrene resin by using extrusion molding, requires only one molding step, for example. As a result, improvement in quality from the viewpoint of suppression of the deterioration of a resin and reduction of a burnt resin through the reduction of thermal history can be achieved in combination with cost reduction through reduced production steps.

CITATION LIST

Patent Literature

Patent Literature 1: Japanese Patent Laid-Open No. H08-193161

SUMMARY OF INVENTION

Technical Problem

However, molding of a dry blend by using injection molding is, as a matter of fact, limited to some cases such as addition of a colored master batch.

The reason is that it is not easy to disperse a plurality of resin components homogeneously with a screw of an injection molding machine, which lacks a function to knead and disperse, and it is difficult to obtain a satisfactory material due to, for example, poor appearance such as a flow mark and problems in mechanical characteristics such as lowered impact resistance. When a thermoplastic elastomer as an impact modifier is molded in a dry blend, it is especially difficult to achieve the same impact resistance as in the case that the thermoplastic elastomer has been homogeneously blended in advance with a twin-screw extruder.

Even when the resin composition described in Patent Literature 1 is used for dry-blend molding, the appearance is significantly deteriorated due to the occurrence of a flow mark or the like, and the mechanical characteristics are significantly degraded as manifested by the impact strength significantly lower than that in the case of kneading with an extruder. Thus, injection molding of a dry blend is virtually impossible.

As described above, conventional arts, in particular regarding to thermoplastic resin compositions for injection molding, are based on injection molding after temporal production of a pellet of a blended composition by using extrusion molding.

The present invention was made in view of the above problems, and it is an object of the present invention to provide a thermoplastic resin composition having excellent appearance when molded and high impact resistance in combination, a molded product of the thermoplastic resin composition, and a method for producing the molded product.

Solution to Problem

As a result of diligent studies to solve the above problems, the present inventor has found that the above problems can be solved by combining given two types of copolymers, and have completed the present invention.

Specifically, the present invention is as follows:

[1]
A thermoplastic resin composition comprising:
a block copolymer (a) comprising 60 to 80% by mass of a vinyl aromatic monomer unit and 40 to 20% by mass of a conjugated diene monomer unit; and
a copolymer (b) comprising 60 to 90% by mass of a vinyl aromatic monomer unit and 40 to 10% by mass of an unsaturated nitrile monomer unit, wherein
the block copolymer (a) has at least one polymer block (S) primarily comprising a vinyl aromatic monomer unit,
the block copolymer (a) has at least one tan δ peak of dynamic viscoelasticity at a temperature in a range of −73 to −10° C., and
a mass ratio (a)/(b) of the block copolymer (a) to the copolymer (b) is 1/99 to 80/20.

[2]
The thermoplastic resin composition according to item [1], wherein the block copolymer (a) comprises at least one random copolymer block (B/S) comprising a vinyl aromatic monomer unit and a conjugated diene monomer unit.

[3]
The thermoplastic resin composition according to item [1] or [2], wherein the block copolymer (a) comprises at least two blocks of the polymer block (S).

[4]
The thermoplastic resin composition according to any one of items [1] to [3], wherein
a proportion of the vinyl aromatic monomer unit included in the polymer block (S) is 50 to 90% by mass based on a total amount of the vinyl aromatic monomer unit in the block copolymer (a), and
a number average molecular weight (Mn) of the polymer block (S) is 10000 to 60000.

[5]
The thermoplastic resin composition according to any one of items [1] to [4], wherein a molecular weight distribution (Mw/Mn) of the polymer block (S) is 1.3 to 4.0.

[6]
The thermoplastic resin composition according to any one of items [1] to [5], wherein a refractive index (na) of the block copolymer (a) and a refractive index (nb) of the copolymer (b) satisfy the following relation (1):

$$-0.010 \leq na-nb \leq 0.008 \quad (1).$$

[7]
The thermoplastic resin composition according to any one of items [1] to [6], wherein a content Ma (% by mass) of the conjugated diene monomer unit in the block copolymer (a) and a content Mb (% by mass) of the unsaturated nitrile monomer unit in the copolymer (b) satisfy the following relation (2):

$$-50 \leq 7.00 \times Ma - 8.62 \times Mb \leq 50 \quad (2).$$

[8]
The thermoplastic resin composition according to any one of items [1] to [7], wherein a solubility parameter value δa of the block copolymer (a) and a solubility parameter value δb of the copolymer (b) satisfy the following relation (3):

$$1.0 \leq \delta b - \delta a \leq 2.3 \quad (3).$$

[9]
The thermoplastic resin composition according to any one of items [1] to [8], wherein a mass ratio (a)/(b) of the block copolymer (a) to the copolymer (b) is 1/99 to 65/35.

[10]
The thermoplastic resin composition according to any one of items [1] to [9], wherein a mass ratio (a)/(b) of the block copolymer (a) to the copolymer (b) is 1/99 to 50/50.

[11]
A molded product comprising the thermoplastic resin composition according to any one of items [1] to [10].

[12]
A method for producing a molded product comprising a step of dry-blending the thermoplastic resin composition according to any one of items [1] to [10], and a molding step of injection-molding the dry-blended thermoplastic resin composition.

Advantageous Effects of Invention

The present invention can provide a thermoplastic resin composition having excellent appearance when molded and high impact resistance in combination, and a molded product of the thermoplastic resin composition, and a method for producing the molded product.

DESCRIPTION OF EMBODIMENTS

Hereinafter, embodiments of the present invention (hereinafter, referred to as "the present embodiments") will be described in detail, but the present invention is not limited to them and can be implemented with various modifications within the scope of the gist.

[Thermoplastic Resin Composition]

A thermoplastic resin composition according to the present embodiments comprises:
a block copolymer (a) comprising 60 to 80% by mass of a vinyl aromatic monomer unit and 40 to 20% by mass of a conjugated diene monomer unit; and
a copolymer (b) comprising 60 to 90% by mass of a vinyl aromatic monomer unit and 40 to 10% by mass of an unsaturated nitrile monomer unit, and
the block copolymer (a) has at least one polymer block (S) primarily comprising a vinyl aromatic monomer unit,
the block copolymer (a) has at least one tan δ peak of dynamic viscoelasticity at a temperature in the range of −73 to −10° C., and
the mass ratio (a)/(b) of the block copolymer (a) to the copolymer (b) is 1/99 to 80/20.

In the present specification, nomenclature for each monomer unit included in a polymer is in accordance with that for a monomer from which the monomer unit is derived. For example, a "vinyl aromatic monomer unit" refers to a constitutional unit of a polymer resulting from polymerization of a vinyl aromatic monomer as the monomer, and the structure is a molecular structure in which two carbon atoms in a substituted ethylene group derived from a substituted vinyl group serve as the main chain of the polymer. A "conjugated diene monomer unit" refers to a constitutional unit of a polymer resulting from polymerization of a conjugated diene as the monomer, and the structure is a molecular structure in which two carbon atoms in an olefin derived from a conjugated diene monomer serve as the main chain of the polymer. An "unsaturated nitrile monomer unit" refers to a constitutional unit of a polymer resulting from polymerization of an unsaturated nitrile monomer as the monomer, and the structure is a molecular structure in which two carbon atoms in a substituted ethylene group derived from a substituted vinyl group serve as the main chain of the polymer.

Here, the term "primarily comprising" used herein means that the content of a given monomer unit is 90% by mass or more. For example, "a polymer block primarily comprising a vinyl aromatic monomer unit" in the block copolymer (a) refers to a block comprising 90% by mass or more of a vinyl aromatic monomer unit and 10% by mass or less of a conjugated diene monomer unit. A polymer block comprising less than 90% by mass of a vinyl aromatic monomer unit and more than 10% by mass of a conjugated diene monomer unit is defined as a random copolymer block. The random copolymer block may have a completely-random structure or a tapered structure (a structure in which the copolymerization composition ratio gradually changes along the chain).

[Block Copolymer (a)]

The block copolymer (a) comprises 60 to 80% by mass of a vinyl aromatic monomer unit and 40 to 20% by mass of a conjugated diene monomer unit on the basis of the total amount of the block copolymer (a). The block copolymer (a) may include an additional polymerizable compound unit other than the vinyl aromatic monomer unit and the conjugated diene monomer unit, as necessary.

The vinyl aromatic monomer is not especially limited as long as it is a compound having an aromatic ring and a vinyl group in the molecule, and examples thereof include styrene, o-methylstyrene, m-methylstyrene, p-methylstyrene, o-ethylstyrene, p-ethylstyrene, p-tert-butylstyrene, 2,4-dimethylstyrene, 1,3-dimethylstyrene, α-methylstyrene, α-methyl-p-methylstyrene, vinylnaphthalene, vinylanthracene, and 1,1-diphenylethylene. In particular, styrene is common and preferred. They may be used singly, or two or more thereof may be used in combination.

The conjugated diene monomer is not especially limited as long as it is a diolefin having a pair of conjugated double bonds, and examples thereof include 1,3-butadiene, 2-methyl-1,3-butadiene (isoprene), 2,3-dimethyl-1,3-butadiene, 1,3-pentadiene, and 1,3-hexadiene. In particular, 1,3-butadiene and isoprene are common and preferred.

They may be used singly, or two or more thereof may be used in combination.

The content of the vinyl aromatic monomer unit is 60% by mass to 80% by mass, preferably 63% by mass to 77% by mass, and more preferably 66% by mass to 74% by mass, based on the total amount of the block copolymer (a). The content of the conjugated diene monomer unit is 40% by mass to 20% by mass, preferably 37% by mass to 23% by mass, and more preferably 34% by mass to 26% by mass, based on the total amount of the block copolymer (a). Use of a block copolymer (a) having a content of the vinyl aromatic monomer unit and a content of the conjugated diene monomer unit in the above ranges provides a thermoplastic resin composition excellent in impact resistance.

The content of the vinyl aromatic monomer unit and the content of the conjugated diene monomer unit in the block copolymer (a) can be measured with a UV meter (ultraviolet ray absorptiometer), specifically, in accordance with a method described later in Examples.

The block copolymer (a) comprises at least one polymer block (S) primarily comprising a vinyl aromatic monomer unit. In addition, the block copolymer (a) preferably further comprises at least one random copolymer block (B/S) comprising a vinyl aromatic monomer unit and a conjugated diene monomer unit. The copolymer block (B/S) further comprised tends to improve the impact resistance. The block copolymer (a) preferably comprises at least two polymer blocks (S). At least two polymer blocks (S) comprised tend to improve the mechanical characteristics such as impact resistance and scratch resistance.

Such a block copolymer (a) is not especially limited, and examples thereof include block copolymers having the following block structures:

S1-B/S1

S1-B/S1-S2

S1-B/S1-S2-B/S2

S1-B/S1-B/S2-S2

S1-B1-B/S1-S2

S1-B1-B/S1-B2-S2

(wherein, S denotes a polymer block (S) primarily comprising a vinyl aromatic monomer unit; B denotes a polymer block (B) primarily comprising a conjugated diene monomer unit; and B/S denotes a random copolymer block (B/S) in which the contents of the vinyl aromatic monomer unit and the conjugated diene monomer unit are each less than 90% by mass.)

In the above formulas each representing a block structure, numbers after S, B, and B/S are numbers for identifying a polymer block (S), a polymer block (B), and a random copolymer block (B/S), respectively, and blocks with different numbers may be the same or different in molecular weight (degree of polymerization) or copolymerization ratio.

The chain structure of the random copolymer block (B/S) may be a random block or a tapered block (a block in which the composition ratio gradually changes along the chain).

The block copolymer (a) may be a linear block copolymer or a branched block copolymer, but preferably a linear block copolymer from the viewpoint of balance between moldability and impact resistance.

In addition, the block copolymer (a) is preferably a block copolymer in which the polymer block (S) is bonded to each end of a linear block copolymer from the viewpoint of the mechanical characteristics such as impact resistance of the thermoplastic resin composition.

<Method for Producing Block Copolymer (a)>

The block copolymer (a) can be obtained by copolymerizing a vinyl aromatic monomer and a conjugated diene monomer with a polymerization initiator in a hydrocarbon solvent.

The hydrocarbon solvent to be used for producing the block copolymer (a) may be a conventionally-known hydrocarbon solvent, and is not especially limited, and examples thereof include aliphatic hydrocarbons such as n-butane, isobutane, n-pentane, n-hexane, n-heptane, and n-octane; alicyclic hydrocarbons such as cyclopentane, methylcyclopentane, cyclohexane, methylcyclohexane, cycloheptane, and methylcycloheptane; and aromatic monomers such as benzene, toluene, xylene, and ethylbenzene. They may be used singly, or two or more thereof may be used in a mixture. Among them, n-hexane and cyclohexane are common and preferably used.

The polymerization initiator is not especially limited, and examples thereof include alkali metal compounds such as aliphatic hydrocarbon-alkali metal compounds, aromatic monomer-alkali metal compounds, and organic amino-alkali metal compounds, each of which is known to have an anionic polymerization activity to a conjugated diene monomer and a vinyl aromatic monomer.

The alkali metal in the alkali metal compound is not especially limited, and examples thereof include lithium, sodium, and potassium. A suitable alkali metal compound is not especially limited, and examples thereof include $C_{1-20}$ aliphatic and aromatic hydrocarbon-lithium compounds containing one lithium atom per molecule, and those containing a plurality of lithium atoms such as dilithium compounds, trilithium compounds, and tetralithium compounds. Such an alkali metal compound is not especially limited, and specific examples thereof include n-propyllithium, n-butyllithium, sec-butyllithium, tert-butyllithium, hexamethylenedilithium, butadienyldilithium, isoprenyldilithium, a reaction product of diisopropenylbenzene and sec-butyllithium, and further a reaction product of divinylbenzene, sec-butyllithium, and a small amount of 1,3-butadiene. In addition, organic alkali metal compounds disclosed, for example, in U.S. Pat. No. 5,708,092, British Patent No. 2,241,239, and U.S. Pat. No. 5,527,753 may be used. They may be used singly, or two or more thereof may be used in a mixture. In particular, n-butyllithium is common and preferably used.

The process for producing the block copolymer (a) is not especially limited, and examples thereof include a process in which an initiator is added in the middle of polymerization, and a process in which an alcohol, water, or the like in an amount less than polymerization-active point is added in the middle of polymerization and a monomer is then supplied again to continue the polymerization. By appropriately selecting such a process, a block copolymer (a) can be prepared in which a plurality of components with different molecular weights is present.

The content of the vinyl aromatic monomer unit and the content of the conjugated diene monomer unit in the block copolymer (a), which is to be obtained finally, can be controlled by adjusting the charging ratio between a vinyl aromatic monomer and a conjugated diene monomer as starting materials for polymerization in a process for producing the block copolymer (a).

Examples of methods for preparing a copolymer block comprising a vinyl aromatic monomer unit and a conjugated diene monomer unit include a method in which a mixture of a vinyl aromatic monomer and a conjugated diene monomer is continuously supplied to a polymerization system for polymerization, and a method in which a vinyl aromatic monomer and a conjugated diene monomer are copolymerized with a polar compound or randomizer.

The polar compound or randomizer is not especially limited, and examples thereof include ethers such as tetrahydrofuran, diethylene glycol dimethyl ether, and diethylene glycol dibutyl ether; amines such as triethylamine and tetramethylethylenediamine; thioethers; phosphines; phosphoramides; alkyl benzenesulfonates; and alkoxides of potassium and sodium.

<Average Molecular Weight and Molecular Weight Distribution of Block Copolymer (a)>

The weight average molecular weight (Mw) and number average molecular weight (Mn) of the block copolymer (a) are each preferably 10000 to 1000000, more preferably 30000 to 400000, and further preferably 40000 to 300000. The weight average molecular weight (Mw) and number average molecular weight (Mn) of the block copolymer (a) in the above range tend to improve the balance between moldability and mechanical characteristics of the thermoplastic resin composition. The weight average molecular weight (Mw) and number average molecular weight (Mn) of the block copolymer (a) can be measured in accordance with a method described in Examples.

The molecular weight distribution (Mw/Mn) of the block copolymer (a) is not especially limited. By using a coupling agent or the like to allow some of the polymerization-active ends of the polymer to associate with each other, a block copolymer (a) having a combination of different molecular weights can be obtained. In addition, polymerization of a part of the polymer can be suspended in the middle of the polymerization by adding an alcohol such as ethanol in an amount by mole less than that of a polymerization initiator used, and as a result a block copolymer (a) in a mixture of different molecular weights can be obtained. The molecular weight distribution (Mw/Mn) of the block copolymer (a) can be measured in accordance with a method described in Examples.

<Proportion of Vinyl Aromatic Monomer Unit Comprised in Polymer Block (S)>

The proportion of the vinyl aromatic monomer unit comprised in the polymer block (S) (hereinafter, also referred to as "percentage of the polymer block (S)") is preferably 50 to 90% by mass, more preferably 55 to 85% by mass, and further preferably 60 to 80% by mass, based on the total amount of the vinyl aromatic monomer unit in the block copolymer (a). The proportion of the vinyl aromatic monomer unit comprised in the polymer block (S) in the range tends to provide a thermoplastic resin composition having good moldability and being excellent in impact resistance. The percentage of the polymer block (S) in the block copolymer (a) can be controlled by changing the weight ratio between the vinyl aromatic monomer and the conjugated diene in the random copolymer block (B/S) in the block copolymer (a), i.e., adjusting the ratio between the amounts of these starting materials to be charged.

The percentage of the polymer block (S) in the block copolymer (a) can be calculated by dividing the weight of the polymer block (S) component (excluding a polymer-constituting component of a vinyl aromatic monomer having an average degree of polymerization of about 30 or less) obtained in accordance with a method in which a block copolymer is oxidatively decomposed by di-tert-butyl hydroperoxide with osmium tetroxide as a catalyst (a method described in I. M. KOLTHOFF, et al., J. Polym. Sci. 1, 429 (1946)) by the total weight of the vinyl aromatic monomer in the block copolymer (a).

<Number Average Molecular Weight of Polymer Block (S)>

The number average molecular weight (Mn) of the polymer block (S) is preferably 10000 to 60000, more preferably 15000 to 50000, and further preferably 20000 to 40000. The number average molecular weight (Mn) of the polymer block (S) in the range tends to provide a thermoplastic resin composition having an excellent appearance when molded and high impact resistance in combination. The number average molecular weight of the polymer block (S) in the block copolymer (a) can be controlled by adjusting the amount of a vinyl aromatic monomer to be fed based on the amount of a polymerization initiator to be fed.

In the case that the block copolymer (a) comprises at least two or more polymer blocks (S) in the present embodiments, the molecular weights of these polymer blocks (S) can be each controlled independently. Here, the number average molecular weight (Mn) of the polymer block (S) is defined as the average molecular weight of the total of the polymer blocks (S). In the case that the block copolymer (a) has an S1-B/S1-S2 structure, for example, the average molecular weight of the polymer block (S) is defined as the number average molecular weight of the total of S1 and S2.

The number average molecular weight of the polymer block (S) in the block copolymer (a) can be obtained in measurement for the polymer block (S) component (excluding a polymer-constituting component of a vinyl aromatic monomer having an average degree of polymerization of about 30 or less) obtained in accordance with a method in which a block copolymer is oxidatively decomposed by di-tert-butyl hydroperoxide with osmium tetroxide as a catalyst (a method described in I. M. KOLTHOFF, et al., J. Polym. Sci. 1, 429 (1946)) with use of gel permeation chromatography (GPC), specifically, in accordance with a method described in Examples.

<Molecular Weight Distribution (Mw/Mn) of Polymer Block (S)>

The molecular weight distribution (Mw/Mn) of the polymer block (S) is preferably 1.3 to 4.0, more preferably 1.4 to 3.5, and further preferably 1.5 to 3.0. The molecular weight distribution (Mw/Mn) of the polymer block (S) in the range provide good balance between moldability and dispersibility in the copolymer (b), and tends to provide a molded product having a good appearance with no flow marks. The molecular weight distribution (Mw/Mn) of the polymer block (S) in the block copolymer (a) can be controlled by adjusting the amount of a vinyl aromatic monomer to be supplied based on the amount of a polymerization initiator to be supplied.

In the case that the block copolymer (a) comprises at least two or more polymer blocks (S) in the present embodiments, the molecular weight distributions of these polymer blocks (S) can be each controlled independently. Here, the molecular weight distribution (Mw/Mn) of the polymer block (S) is defined as the average molecular weight distribution of the total of the polymer blocks (S). In the case that the block copolymer (a) has an S1-B/S1-S2 structure, for example, the average molecular weight distribution of the polymer block (S) is defined as the average molecular weight distribution of S1 and S2.

In the case that the block copolymer (a) comprises at least two or more polymer blocks (S) in the present embodiments, even the molecular weight distribution of the polymer block (S) can be controlled by controlling each of the molecular weights of S1 and S2, as the two polymer blocks (S), independently.

In another method for controlling the molecular weight distribution (Mw/Mn) of the polymer block (S) in the block copolymer (a), polymerization of a part of the polymer is suspended in the middle of the polymerization by adding an alcohol such as ethanol in an amount by mole less than that of a polymerization initiator to obtain a block copolymer (a) comprising a polymer block (S) having a different number average molecular weight, and thereby the molecular weight distribution of the polymer block (S) can be controlled.

The molecular weight distribution of the polymer block (S) in the block copolymer (a) can be determined in accordance with a method described later in Examples.

<Temperature at Tan δ Peak of Dynamic Viscoelasticity of Block Copolymer (a)>

The block copolymer (a) has at least one loss tangent (tan δ) peak as measured in dynamic viscoelasticity measurement at a temperature in the range of −73° C. to −10° C. The range of a temperature at a tan δ peak is preferably −70° C. to −10° C., more preferably −65° C. to −15° C., further preferably −60° C. to −20° C., furthermore preferably −50° C. to −25° C., and particularly preferably −45° C. to −25° C. The block copolymer (a) having a tan δ peak at a temperature in the range tends to allow a thermoplastic resin composition with the block copolymer (a) to exhibit excellent impact resistance. The temperature at a tan δ peak of the block copolymer (a) can be measured in accordance with a method described later in Examples. The tan δ peak is derived from the random copolymer block (B/S) in the block copolymer (a). In the case that a plurality of random copolymer blocks (B/S) having different ratios between the vinyl aromatic monomer unit and the conjugated diene monomer unit is comprised, for example, a plurality of peaks may be present. The temperature at a tan δ peak of dynamic viscoelasticity elevates as the copolymerization ratio of the vinyl aromatic monomer unit increases, and lowers as the copolymerization ratio of the vinyl aromatic monomer unit decreases. The block copolymer (a) may have a tan δ peak at a temperature out of the above range.

<Melt Flow Rate of Block Copolymer (a)>

The melt flow rate (ISO 1133, temperature: 200° C., load: 5 kgf) of the block copolymer (a) is preferably 0.1 to 50 g/10 min, more preferably 1 to 20 g/10 min, and further preferably 3 to 15 g/10 min. The melt flow rate of the block copolymer (a) in the range tends to improve the appearance when molded and impact resistance of the thermoplastic resin composition. The melt flow index of the block copolymer (a) can be measured in accordance with a method described in Examples.

<Mass Ratio of Block Copolymer (a) to Copolymer (b)>

The mass ratio ((a)/(b)) of the block copolymer (a) to the copolymer (b) is 1/99 to 80/20, preferably 1/99 to 75/25, more preferably 1/99 to 70/30, further preferably 1/99 to 65/35, furthermore preferably 1/99 to 50/50, still furthermore preferably 5/95 to 50/50, and particularly preferably 5/95 to 40/60. The mass ratio ((a)/(b)) of the block copolymer (a) to the copolymer (b) in the above range tends to provide a thermoplastic resin composition having enhanced surface hardness and good scratch resistance, while keeping a good appearance when molded and impact resistance, each of which is a feature of the thermoplastic resin composition. The composition ratio between the block copolymer (a) and the copolymer (b) can be read from a liquid chromatograph.

The content of the block copolymer (a) is preferably 1 to 80% by mass, more preferably 1 to 75% by mass, further preferably 1 to 70% by mass, furthermore preferably 1 to 65% by mass, still furthermore preferably 1 to 50% by mass, particularly preferably 5 to 50% by mass, and most preferably 5 to 40% by mass, based on the total amount of the thermoplastic resin composition.

The content of the copolymer (b) is preferably 20 to 99% by mass, more preferably 25 to 99% by mass, further preferably 30 to 99% by mass, furthermore preferably 35 to 99% by mass, still furthermore preferably 50 to 99% by mass, particularly preferably 50 to 95% by mass, and most preferably 60 to 95% by mass, based on the total amount of the thermoplastic resin composition.

<Refractive Index of Block Copolymer (a)>

The refractive index of the block copolymer (a) is preferably 1.556 to 1.588, more preferably 1.560 to 1.584, further preferably 1.563 to 1.577, and furthermore preferably 1.566 to 1.573. The refractive index of the block copolymer (a) in the range tends to enhance the impact resistance. The refractive index of the block copolymer (a) increases as the copolymerization ratio of the vinyl aromatic hydrocarbon monomer unit increases, and decreases as the copolymerization ratio of the conjugated diene monomer unit increases. The refractive index of the block copolymer (a) can be measured in accordance with a method described in Examples.

In the case that the block copolymer (a) is a binary copolymer of styrene and 1,3-butadiene, the relation between the refractive index and the copolymerization ratio is approximately represented by the following equation:

$$\text{Refractive index of block copolymer } (a) = 1.591 - 0.0700 \times (\text{weight fraction of 1,3-butadiene}) \quad (6)$$

[Copolymer (b)]

The copolymer (b) comprises a vinyl aromatic monomer unit and an unsaturated nitrile monomer unit. The copolymer (b) may comprise an additional polymerizable compound unit other than the vinyl aromatic monomer unit and the unsaturated nitrile monomer unit, as necessary.

The vinyl aromatic monomer is not especially limited as long as it is a compound having an aromatic ring and a vinyl group in the molecule, and examples thereof include alkylstyrenes such as styrene, α-methylstyrene, o-methylstyrene, m-methylstyrene, p-methylstyrene, o-ethylstyrene, p-ethylstyrene, p-t-butylstyrene, 2,4-dimethylstyrene, 1,3-dimethylstyrene, and α-methyl-p-methylstyrene, in particular, styrene derivatives substituted with a $C_{1-4}$ alkyl group; and vinylnaphthalene, vinylanthracene, and 1,1-diphenylethylene. Among them, styrene and α-methylstyrene are preferred. They may be used singly, or two or more thereof may be used in combination.

The unsaturated nitrile monomer is not especially limited as long as it has a nitrile group and a vinyl group in the molecule, and examples thereof include acrylonitrile, methacrylonitrile, and ethacrylonitrile. Among them, acrylonitrile is preferred. They may be used singly, or two or more thereof may be used in combination.

The additional copolymerizable compound is not especially limited, and examples thereof include (meth)acrylate compounds such as butyl acrylate, ethyl acrylate, and methyl methacrylate; and N-phenyl maleimide, and maleic anhydride. Among them, butyl acrylate is preferred. They may be used singly, or two or more thereof may be used in combination.

In view of compatibility with the block copolymer (a), the mechanical characteristics of the composition, economic efficiency, and so on, the copolymer (b) preferably comprises a styrene unit and an acrylonitrile unit, and an additional compound unit polymerizable with them, as necessary. That is, an acrylonitrile/styrene copolymer resin (commonly referred to as a SAN resin, also referred to as an AS resin) is preferably used for the copolymer (b).

The content of the additional polymerizable compound is preferably 20% by mass or less, more preferably 10% by mass or less, further preferably 0% by mass based on the total amount of the copolymer (b), that is, the polymer unit containing no additional polymerizable compounds is a copolymer consisting of two components of a vinyl aromatic monomer unit and an unsaturated nitrile monomer unit. The content of the additional polymerizable compound in the range tends to enhance the compatibility with the block copolymer (a), and improve the mechanical characteristics of the resin composition and the economic efficiency.

<Method for Producing Copolymer (b)>

The copolymer (b) can be synthesized in accordance with a known polymerization method such as bulk polymerization and suspension polymerization.

In the case of bulk polymerization, any organic solvent can be used as long as it is an organic solvent which is inactive to the reaction, and allows an unreacted monomer and/or a copolymer produced through polymerization and the organic solvent in a reaction chamber to form a homogeneous phase at a composition in the reaction chamber at a polymerization temperature.

Such an organic solvent is not especially limited, and examples thereof include aromatic hydrocarbons such as ethylbenzene and toluene; halogenated hydrocarbons such as chloroform, dichloromethylene and carbon tetrachloride; ketones such as methyl ethyl ketone, methyl propyl ketone, diethyl ketone, methyl isobutyl ketone, dipropyl ketone, methyl amyl ketone, cyclohexanone, methylcyclohexanone, and acetyl acetone; and, in addition, acetonitrile and dimethyl formamide. The organic solvent is preferably an aromatic monomer such as ethylbenzene and toluene, a ketone such as methyl ethyl ketone and methyl isobutyl ketone. They may be used singly, or two or more thereof may be used in a mixture. Typically, the amount of the organic solvent to be used is preferably 10 to 100 parts by mass, and more preferably 20 to 70 parts by mass, based on 100 parts by mass of the total amount of the monomer mixture.

<Contents of Unsaturated Nitrile Monomer Unit and Vinyl Aromatic Monomer Unit (% by Mass)>

The content of the unsaturated nitrile monomer unit is 10 to 40% by mass, preferably 15 to 30% by mass, and more preferably 19 to 28% by mass, based on the total amount of the copolymer (b). The content of the vinyl aromatic monomer unit in the copolymer (b) is 60 to 90% by mass, preferably 70 to 85% by mass, and more preferably 72 to 81% by mass. The contents of the unsaturated nitrile monomer unit and the vinyl aromatic monomer unit in the ranges tend to enhance the compatibility with the block copolymer (a) and improve the mechanical characteristics of the thermoplastic resin composition.

Alternatively, two or more copolymers (b) having different copolymerization composition ratios of the unsaturated nitrile monomer may be used in combination. In this case, a plurality of copolymers (b) having a near copolymerization composition tends to improve the appearance when molded and impact resistance. Thus, when a plurality of copolymers (b) is used in combination, the difference in copolymerization composition ratio of the unsaturated nitrile monomer is preferably within 5% by mass. In addition, copolymers (b) different in weight average molecular weight, number average molecular weight, or molecular weight distribution may be used in combination, and two or more copolymers (b) obtained by different polymerization methods may be used in combination.

The content (% by mass) of the unsaturated nitrile monomer unit in the copolymer (b) can be determined in proton NMR measurement. In the case that the copolymer (b) comprises an additional copolymerizable monomer unit, measurement is performed after confirming the presence of the additional monomer unit, for example, with use of the infrared spectrum.

By utilizing the feature that the refractive index is uniquely determined by the copolymerization ratio, a master curve of the % by weight of the acrylonitrile and the refractive index was prepared for a known styrene-acrylonitrile copolymer resin with use of an Abbe refractometer manufactured by ATAGO CO., LTD. at a measurement wavelength of 589 nm. By using the master curve obtained, the content (% by mass) of the acrylonitrile can be determined from the measurement result of the refractive index for the copolymer (b).

<Average Molecular Weight and Molecular Weight Distribution of Copolymer (b)>

The weight average molecular weight (Mw) and number average molecular weight (Mn) of the copolymer (b) are both preferably 10000 to 1000000, and more preferably 30000 to 300000. The weight average molecular weight (Mw) and number average molecular weight (Mn) of the copolymer (b) in the above range tends to improve the balance between mechanical characteristics and processability of the thermoplastic resin composition. The weight average molecular weight (Mw) and number average molecular weight (Mn) of the copolymer (b) can be measured in accordance with a method described later in Examples.

The molecular weight distribution Mw/Mn of the copolymer (b) is not especially limited. The molecular weight distribution (Mw/Mn) can be adjusted in accordance with a polymerization method. The molecular weight distribution (Mw/Mn) of the copolymer (b) can be measured by using a method described later in Examples.

<Melt Flow Rate of Copolymer (b)>

The melt flow rate (ISO 1133, temperature: 200° C., load: 5 kgf) of the copolymer (b) is preferably 0.1 to 50 g/10 min, more preferably 0.5 to 20 g/10 min, and further preferably 1 to 10 g/10 min. The melt flow rate of the copolymer (b) in the range tends to improve the moldability of the thermoplastic resin composition. The melt flow rate of the copolymer (b) can be measured in accordance with a method described in Examples.

<Refractive Index of Copolymer (b)>

The refractive index of the copolymer (b) is preferably 1.556 to 1.582, more preferably 1.565 to 1.578, and further preferably 1.567 to 1.574. The refractive index of the copolymer (b) in the above range tends to enhance the oil resistance and scratch resistance. The refractive index of the copolymer (b) increases as the copolymerization ratio of the vinyl aromatic hydrocarbon monomer unit increases, and decreases as the copolymerization ratio of the unsaturated nitrile monomer unit increases. The refractive index of the copolymer (b) can be measured in accordance with a method described in Examples.

In the case that the copolymer (b) is a binary copolymer of styrene and acrylonitrile, the refractive index can be approximated by the following equation (7):

$$\text{Refractive Index of Copolymer } (b) = 1.591 - 0.0862 \times (\text{Weight Fraction of Acrylonitrile}) \quad (7)$$

<Difference in Refractive Index Between Block Copolymer (a) and Copolymer (b)>

The refractive index (na) of the block copolymer (a) and the refractive index (nb) of the copolymer (b) preferably satisfy the following relation (1), more preferably satisfy the following relation (4), and further preferably satisfy the following relation (5). The refractive index (na) of the block copolymer (a) and the refractive index (nb) of the copolymer (b) satisfying the following relation (1) provide a resin composition having a good transparency.

$$-0.010 \leq na - nb \leq 0.008 \quad (1)$$

$$-0.005 \leq na - nb \leq 0.005 \quad (4)$$

$$-0.003 \leq na - nb \leq 0.003 \quad (5)$$

<Content Ma (% by Mass) of Conjugated Diene Monomer Unit in Block Copolymer (a), and Content Mb (% by Mass) of Unsaturated Nitrile Monomer Unit in Copolymer (b)>

The content Ma (% by mass) of the conjugated diene monomer unit in the block copolymer (a) and the content Mb (% by mass) of the unsaturated nitrile monomer unit in the copolymer (b) preferably satisfy the following relation (2), more preferably satisfy the following relation (8), and further preferably the following relation (9). The content Ma (% by mass) of the conjugated diene monomer unit in the block copolymer (a) and the content Mb (% by mass) of the unsaturated nitrile monomer unit in the copolymer (b) satisfying the following formula tend to enhance the transparency.

$$-50 \leq 7.00 \times Ma - 8.62 \times Mb \leq 50 \quad (2)$$

$$-40 \leq 7.00 \times Ma - 8.62 \times Mb \leq 40 \quad (8)$$

$$-20 \leq 7.00 \times Ma - 8.62 \times Mb \leq 20 \quad (9)$$

In particular, in the case that the conjugated diene monomer unit in the block copolymer (a) is butadiene and the unsaturated nitrile monomer unit in the copolymer (b) is acrylonitrile, it is preferable that the above formula be satisfied. In the case that the content of the conjugated diene monomer unit in the block copolymer (a) is 20 to 40% by mass and the content of the unsaturated nitrile monomer unit in the copolymer (b) is 10 to 40% by mass, it is more preferable that the above formula be satisfied.

<Difference in Solubility Parameter Value ($\delta b - \delta a$)>

The solubility parameter value $\delta a$ of the block copolymer (a) and the solubility parameter value $\delta b$ of the copolymer (b) preferably satisfy the following relation (3), more preferably satisfy the following relation (10), and further preferably satisfy the following relation (11). The solubility parameter value $\delta a$ of the block copolymer (a) and the solubility parameter value $\delta b$ of the copolymer (b) satisfying the following formula tend to improve the balance among transparency, mechanical characteristics, compatibility, and oil resistance of a resin composition. The solubility parameter value can be determined in accordance with a method described in Examples.

$$1.0 \leq \delta b - \delta a \leq 2.3 \quad (3)$$

$$1.5 \leq \delta b - \delta a \leq 2.1 \quad (10)$$

$$1.7 \leq \delta b - \delta a \leq 2.0 \quad (11)$$

The solubility parameter value of the block copolymer (a) is preferably 18.53 to 19.41, more preferably 18.62 to 19.31, further preferably 18.72 to 19.11, and further preferably 18.81 to 19.01. The solubility parameter value of the block copolymer (a) in the range tends to enhance the impact resistance. The solubility parameter value of the block copolymer (a) increases as the copolymerization ratio of the vinyl aromatic hydrocarbon monomer unit increases, and the solubility parameter value of the block copolymer (a) decreases as the copolymerization ratio of the conjugated diene monomer unit increases. The solubility parameter value of the block copolymer (a) can be measured in accordance with a method described in Examples.

The solubility parameter value of the copolymer (b) is preferably 20.03 to 21.56, more preferably 20.29 to 21.07, and further preferably 20.49 to 20.95. The solubility parameter value of the copolymer (b) in the range tends to enhance the oil resistance and scratch resistance. The solubility parameter value of the copolymer (b) increases as the copolymerization ratio of the unsaturated nitrile monomer unit increases, and the solubility parameter value of the copolymer (b) decreases as the copolymerization ratio of the vinyl aromatic hydrocarbon monomer unit increases. The solubility parameter value of the copolymer (b) can be measured in accordance with a method described in Examples.

(Additional Polymer, Additive, or the Like)

An additional polymer, an additive, or the like may be blended, as necessary, in the thermoplastic resin composition according to the present embodiments. In particular, the thermoplastic resin composition may comprise a styrene homopolymer resin (GPPS). The GPPS content is preferably 20% by mass or less, more preferably 10% by mass or less, and further preferably 0% by mass, based on the total amount of the resin composition. The GPPS content of 20% by mass or less tends to improve the appearance when molded and impact resistance.

The additive is not especially limited, and examples thereof include heat stabilizers such as antioxidants to suppress thermal degradation or oxidative degradation due to heating in kneading of compounds or molding. The content of the additive is preferably 0.1 to 1.5% by mass based on the total amount of the thermoplastic resin composition. The content of the additive in the range tends to allow the additive to sufficiently exert its effect.

The additive is not especially limited, and examples thereof include heat stabilizers such as 2-t-butyl-6(3-t-butyl-2-hydroxy-5-methylbenzyl)-4-methylphenyl acrylate, and antioxidants such as n-octadecyl-β-(4'-hydroxy-3',5'-di-t-butylphenyl) propionate, and they can be preferably used.

The additional additive is not especially limited as long as the additive is commonly used for thermoplastic resins, and examples thereof include inorganic fillers such as glass fiber, glass beads, silica, calcium carbonate, and talk; organic fillers such as organic fibers and coumarone-indene resins; crosslinking agents such as organic peroxides and inorganic peroxides; inorganic pigments such as titanium oxide, carbon black, and iron oxide; organic pigments such as copper phthalocyanine; organic dyes of blue, red, purple, yellow, and so on; flame retardants; ultraviolet absorbers; antistatic agents; lubricants such as fatty acids, fatty acid amides, and metal salts of a fatty acid; and oils such as mineral oils and silicone oils. They may be used singly, or two or more thereof may be used in combination.

[Molded Product]

A molded product according to the present embodiments comprises the above thermoplastic resin composition. The aspect of the molded product is not especially limited, and may be a primary molded product such as a pellet or a strand, a secondary molded product after further molding process, or a final product.

[Method for Producing Thermoplastic Resin Composition and Molded Product]

The thermoplastic resin composition according to the present embodiments may be produced in accordance with a conventionally-known kneading/mixing method, and the method is not especially limited. In addition, the molded product according to the present embodiments may be produced in accordance with a conventionally-known molding method, and the method is not especially limited. Here, a step of producing a thermoplastic resin composition and a step of producing a molded product may be carried out in one step (or in a series of steps). The method is not especially limited, and examples thereof include a method for producing a molded product comprising a step of dry-blending the thermoplastic resin composition (the block copolymer (a) and the copolymer (b)) and a step of molding the dry-blended thermoplastic resin composition by using injection molding.

Examples of methods for kneading, mixing, and molding include melt-kneading methods with a known kneading machine such as a roll, a mixer, a kneader, a Banbury mixer, and an (single-screw or twin-screw) extruder; a method in which, in a process for producing a molded product by using injection molding, extrusion molding, or the like, the block copolymer (a) and the copolymer (b), and an additive, as necessary, which have been dry-blended in advance in a hopper of a molding machine are mixed in the molding machine through a melt-kneading process; and a method in which a solution with the components dissolved in an organic solvent or the like is stirred and mixed, and the solvent is then removed through any method such as heating and reducing the pressure to obtain a mixture.

Here, "dry-blending" refers to mixing the block copolymer (a) and the copolymer (b) each in a solid state, such as a particulate pellet, before being melted together.

In a common method for producing a molded product, a resin composition is melt-kneaded before molding to homogeneously knead the resin in the resin composition so that a molded product having desired characteristics can be obtained. On the other hand, the thermoplastic resin composition according to the present embodiments, even when being injection-molded after dry-blending without melt-kneading, can provide a molded product having an excellent appearance and high impact resistance, to the same degree as, or more than a resin composition which has been melt-kneaded in advance. The thermoplastic resin composition according to the present embodiments does not require a step of melt-kneading, and improvement in quality from the viewpoint of suppression of the deterioration of a resin and reduction of a burnt resin through the reduction of thermal history can be achieved in combination with cost reduction through reduced production steps.

EXAMPLES

Hereinafter, the present invention will be specifically described with reference to specific Examples and Comparative Examples.

First, various block copolymers (a) and copolymers (b) were produced, and test pieces were formed from them as starting materials, and evaluated.

[Block Copolymer (a)]

(Block Copolymer (a)-1)

In a nitrogen atmosphere, 0.08 parts by mass of n-butyllithium and 0.015 parts by mass of tetramethylmethylenediamine were added to a cyclohexane solution containing 20 parts by mass of styrene at a concentration of 25% by mass, and the resultant was subjected to polymerization at 80° C. for 20 minutes. Thereafter, a cyclohexane solution containing 8 parts by mass of 1,3-butadiene at a concentration of 25% by mass was added at once to the polymerization solution obtained, and the resultant was subjected to polymerization at 80° C. for 15 minutes. Subsequently, the polymerization solution was subjected to polymerization at 80° C. while continuously adding thereto a cyclohexane solution containing 9 parts by mass of 1,3-butadiene and 15 parts by mass of styrene at a concentration of 25% by mass over 30 minutes. Next, a cyclohexane solution containing 8 parts by mass of 1,3-butadiene at a concentration of 25% by mass was added to the polymerization solution at once, and the resultant was subjected to polymerization at 80° C. for 15 minutes. Then, a cyclohexane solution containing 3 parts by mass of styrene at a concentration of 25% by mass was added to the polymerization solution, and the resultant was subjected to polymerization at 80° C. for 5 minutes. Subsequently, ethanol was added to the polymerization solution in an amount by mole 0.4 times as large as that of n-butyllithium, and the resultant was retained for 5 minutes. Next, a cyclohexane solution containing 37 parts by mass of styrene at a concentration of 25% by mass was added to the polymerization solution, and the resultant was subjected to polymerization at 80° C. for 25 minutes.

Thereafter, ethanol in an amount by mole 0.6 times as large as that of n-butyllithium was added in the reaction vessel to terminate the polymerization completely, and 0.3 parts by mass of 2-t-butyl-6(3-t-butyl-2-hydroxy-5-methylbenzyl)-4-methylphenyl acrylate as a heat stabilizer was added on the basis of 100 parts by mass of the block copolymer, and subsequently the solvent was removed to obtain a block copolymer (a)-1.

The block copolymer (a)-1 thus obtained was a linear block copolymer having a styrene content of 75% by mass, an S1-B1-B/S-B2-S2 structure, and two peak molecular weights. The temperature at a tan δ peak of dynamic viscoelasticity was −38° C.

(Block Copolymer (a)-2)

In a nitrogen atmosphere, 0.08 parts by mass of n-butyllithium and 0.015 parts by mass of tetramethylmethylenediamine were added to a cyclohexane solution containing 20 parts by mass of styrene at a concentration of 25% by mass, and the resultant was subjected to polymerization at 80° C. for 20 minutes. Subsequently, the polymerization solution was subjected to polymerization at 80° C. while continuously adding thereto a cyclohexane solution containing 14 parts by mass of 1,3-butadiene and 10 parts by mass of styrene at a concentration of 25% by mass over 30 minutes. Next, the polymerization solution was subjected to polymerization at 80° C. while continuously adding thereto a cyclohexane solution containing 16 parts by mass of 1,3-butadiene and 10 parts by mass of styrene at a concentration of 25% by mass over 30 minutes. Then, a cyclohexane solution containing 30 parts by mass of styrene at a concentration of 25% by mass was added to the polymerization solution, and the resultant was subjected to polymerization at 80° C. for 30 minutes.

Thereafter, ethanol in an amount by mole equal to that of n-butyllithium was added in the reaction vessel to terminate the polymerization completely, and 0.3 parts by mass of 2-t-butyl-6(3-t-butyl-2-hydroxy-5-methylbenzyl)-4-methylphenyl acrylate as a heat stabilizer was added on the basis of 100 parts by mass of the block copolymer, and subsequently the solvent was removed to obtain a block copolymer (a)-2.

The block copolymer (a)-2 thus obtained was a block copolymer having a styrene content of 70% by mass, an S1-B/S1-B/S2-S2 structure, and one peak molecular weight in GPC. The temperature at a tan δ peak of dynamic viscoelasticity was −30° C.

(Block Copolymer (a)-3)

A block copolymer (a)-3 was synthesized in the same manner as in the case of the block copolymer (a)-2 except that the amounts of styrene and butadiene to be added were set so as to satisfy a mass ratio listed in Table 1. The block copolymer (a)-3 thus obtained was a block copolymer having a styrene content of 77% by mass, an S1-B/S1-B/S2-S2 structure, and one peak molecular weight in GPC. The temperature at a tan δ peak of dynamic viscoelasticity was −14° C.

(Block Copolymer (a)-4)

In a nitrogen atmosphere, 0.08 parts by mass of n-butyllithium and 0.015 parts by mass of tetramethylmethylenediamine were added to a cyclohexane solution containing 15 parts by mass of styrene at a concentration of 25% by mass, and the resultant was subjected to polymerization at 80° C. for 20 minutes. Subsequently, the polymerization solution was subjected to polymerization at 80° C. while continuously adding thereto a cyclohexane solution containing 38 parts by mass of 1,3-butadiene and 10 parts by mass of styrene at a concentration of 25% by mass over 30 minutes. Next, a cyclohexane solution containing 37 parts by mass of styrene at a concentration of 25% by mass was added to the polymerization solution, and the resultant was subjected to polymerization at 80° C. for 30 minutes.

Thereafter, ethanol in an amount by mole equal to that of n-butyllithium was added in the reaction vessel to terminate the polymerization completely, and 0.3 parts by mass of 2-t-butyl-6(3-t-butyl-2-hydroxy-5-methylbenzyl)-4-methylphenyl acrylate as a heat stabilizer was added on the basis of 100 parts by mass of the block copolymer, and subsequently the solvent was removed to obtain a block copolymer (a)-4.

The block copolymer (a)-4 thus obtained was a block copolymer having a styrene content of 62% by mass, an S1-B/S1-S2 structure, and one peak molecular weight in GPC. The temperature at a tan δ peak of dynamic viscoelasticity was −51° C.

(Block Copolymer (a)-5)

A block copolymer (a)-5 was synthesized in the same manner as in the case of the block copolymer (a)-2 except that the amounts of styrene and butadiene to be added were set so as to satisfy a mass ratio listed in Table 1. The block copolymer (a)-5 thus obtained was a block copolymer having a styrene content of 70% by mass, an S1-B/S1-B/S2-S2 structure, and one peak molecular weight in GPC. The temperature at a tan δ peak of dynamic viscoelasticity was −30° C.

(Block Copolymer (a)-6)

A block copolymer (a)-6 was synthesized in the same manner as in the case of the block copolymer (a)-2 except that the amounts of styrene and butadiene to be added were set so as to satisfy a mass ratio listed in Table 1. The block copolymer (a)-6 thus obtained was a block copolymer having a styrene content of 77% by mass, an S1-B/S1-B/S2-S2 structure, and one peak molecular weight in GPC. The temperature at a tan δ peak of dynamic viscoelasticity was −72° C.

(Block Copolymer (a)-7)

In a nitrogen atmosphere, 0.08 parts by mass of n-butyllithium and 0.015 parts by mass of tetramethylmethylenediamine were added to a cyclohexane solution containing 60 parts by mass of styrene at a concentration of 25% by mass, and the resultant was subjected to polymerization at 80° C. for 20 minutes. Subsequently, the polymerization solution was subjected to polymerization at 80° C. while continuously adding thereto a cyclohexane solution containing 30 parts by mass of 1,3-butadiene and 10 parts by mass of styrene at a concentration of 25% by mass over 30 minutes.

Thereafter, ethanol in an amount by mole equal to that of n-butyllithium was added in the reaction vessel to terminate the polymerization completely, and 0.3 parts by mass of 2-t-butyl-6(3-t-butyl-2-hydroxy-5-methylbenzyl)-4-methylphenyl acrylate as a heat stabilizer was added on the basis of 100 parts by mass of the block copolymer, and subsequently the solvent was removed to obtain a block copolymer (a)-7.

The block copolymer (a)-7 thus obtained was a block copolymer having a styrene content of 70% by mass, an S1-B/S1 structure, and one peak molecular weight in GPC. The temperature at a tan δ peak of dynamic viscoelasticity was −45° C.

(Block Copolymer (a)-8)

In a nitrogen atmosphere, 0.08 parts by mass of n-butyllithium and 0.015 parts by mass of tetramethylmethylenediamine were added to a cyclohexane solution containing 35 parts by mass of styrene at a concentration of 25% by mass, and the resultant was subjected to polymerization at 80° C. for 20 minutes. Subsequently, the polymerization solution was subjected to polymerization at 80° C. while continuously adding thereto a cyclohexane solution containing 30 parts by mass of 1,3-butadiene at a concentration of 25% by mass over 30 minutes. Next, a cyclohexane solution containing 35 parts by mass of styrene at a concentration of 25% by mass was added to the polymerization solution, and the resultant was subjected to polymerization at 80° C. for 30 minutes.

Thereafter, ethanol in an amount by mole equal to that of n-butyllithium was added in the reaction vessel to terminate the polymerization completely, and 0.3 parts by mass of 2-t-butyl-6(3-t-butyl-2-hydroxy-5-methylbenzyl)-4-methylphenyl acrylate as a heat stabilizer was added on the basis of 100 parts by mass of the block copolymer, and subsequently the solvent was removed to obtain a block copolymer (a)-8.

The block copolymer (a)-8 thus obtained was a block copolymer having a styrene content of 70% by mass, an S1-B1-S2 structure, and one peak molecular weight in GPC. The temperature at a tan δ peak of dynamic viscoelasticity was −75° C.

(Block Copolymer (a)-9)

A block copolymer (a)-9 was synthesized in the same manner as in the case of the block copolymer (a)-4 except that the amounts of styrene and butadiene to be added were set so as to satisfy a mass ratio listed in Table 1. The block copolymer (a)-9 thus obtained was a block copolymer having a styrene content of 40% by mass, an S1-B/S1-S2 structure, and one peak molecular weight in GPC. The temperature at a tan δ peak of dynamic viscoelasticity was −76° C.

(a) was dissolved in 100 mL of chloroform; a quartz cell filled with the polymer solution was set in an analyzer; the cell was scanned with a ultraviolet ray having a wave length of 260 to 290 nm to obtain an absorption peak; and the content of the vinyl aromatic monomer unit was determined from the height of the absorption peak by using a calibration curve method. If the vinyl aromatic monomer was styrene, a peak wavelength appears at 269.2 nm.

<Content of Conjugated Diene (Butadiene) in Block Copolymer (a)>

The content of the conjugated diene (butadiene) in a block copolymer (a) was calculated by subtracting the above-obtained content in % by mass of the vinyl aromatic monomer unit from 100% by mass.

<Weight Average Molecular Weight Mw, Number Average Molecular Weight Mn, Molecular Weight Distribution Mw/Mn, and Number of Molecular Weight Peaks of Block Copolymer (a)>

The weight average molecular weight Mw, number average molecular weight Mn, molecular weight distribution Mw/Mn, and the number of molecular weight peaks of block copolymer (a) were measured with a gel permeation chromatography (GPC) apparatus under the following measurement conditions.

TABLE 1

| Production Example | (a)-1 | (a)-2 | (a)-3 | (a)-4 | (a)-5 | (a)-6 | (a)-7 | (a)-8 | (a)-9 |
| --- | --- | --- | --- | --- | --- | --- | --- | --- | --- |
| Structure of block copolymer (a) | S1-B1-B/S-B2-S2 | S1-B/S1-B/S2-S2 | S1-B/S1-B/S2-S2 | S1-B/S1-S2 | S1-B/S1-B/S2-S2 | S1-B/S1-B/S2-S2 | S1-B/S1 | S1-B1-S2 | S1-B/S1-S2 |
| Amounts of vinyl aromatic monomer and conjugated diene monomer to be added (mass ratio) | 20-8-9/15-8-40 | 20-14/10-16/10-30 | 31-21/20-2/6-20 | 15-38/10-37 | 26-14/10-16/10-24 | 35-20/4-3/4-34 | 60-30/10 | 35-30-35 | 17-60/7-16 |
| Content of vinyl aromatic monomer unit (% by mass) | 75 | 70 | 77 | 62 | 70 | 77 | 70 | 70 | 40 |
| Content of conjugated diene monomer unit (% by mass) | 25 | 30 | 23 | 38 | 30 | 23 | 30 | 30 | 60 |
| Weight average molecular weight Mw (10000×) | 15.1 | 11.8 | 11.2 | 13.5 | 12.1 | 8.6 | 10.6 | 12.5 | 8.4 |
| Number average molecular weight Mn (10000×) | 9.4 | 9.0 | 8.7 | 9.9 | 9.1 | 6.9 | 8.8 | 9.6 | 8.1 |
| Molecular weight distribution Mw/Mn | 1.61 | 1.32 | 1.29 | 13.6 | 1.33 | 1.25 | 1.20 | 1.30 | 1.04 |
| Number of molecular weight peaks | 2 | 1 | 1 | 1 | 1 | 1 | 1 | 1 | 1 |
| (Addition of ethanol during reaction) | Once | None | None | None | None | None | None | None | None |
| Proportion of polymer block (S) (% by mass) | 82 | 72 | 68 | 85 | 72 | 91 | 87 | 99 | 83 |
| Number average molecular weight Mn of polymer block (S) (10000×) | 4.3 | 2.6 | 2.2 | 3.4 | 2.5 | 2.6 | 7.7 | 4.0 | 1.3 |
| Molecular weight distribution Mw/Mn of polymer block (S) | 2.8 | 1.7 | 1.4 | 2.1 | 1.2 | 1.3 | 1.1 | 1.2 | 1.1 |
| Melt flow rate* | 5.9 | 6.5 | 7.5 | 7.1 | 6.3 | 10 | 9.0 | 6.7 | 20 |
| Temperature (° C.) at tan δ peak | −38 | −30 | −14 | −51 | −30 | −72 | −45 | −75 | −76 |
| Refractive index | 1.573 | 1.570 | 1.575 | 1.564 | 1.570 | 1.575 | 1.570 | 1.570 | 1.550 |
| Solubility parameter value (δa) | 19.00 | 18.90 | 19.04 | 18.83 | 18.90 | 19.04 | 18.90 | 18.90 | 18.33 |

*Conditions: 200° C., 5 kg

The structure of a block copolymer (a) listed in Table 1 was determined in accordance with the following method.

<Content of Vinyl Aromatic Monomer (Styrene) in Block Copolymer (a)>

The content of the vinyl aromatic monomer unit in the block copolymer (a) was measured with a UV meter (ultraviolet ray absorptiometer). Specifically, about 30 mg (accurately weighed to an order of 0.1 mg) of a block copolymer GPC apparatus: HLC-8220 manufactured by Tosoh Corporation Column: two SuperMultiporeHZ-M connected in series, manufactured by Tosoh Corporation Column temperature: 40° C.

Feeding rate: 0.2 mL/min

Detector: refractometer (RI)

To 50 mg of a polymer to be measured for molecular weight, 10 mL of tetrahydrofuran as a solvent was added to dissolve the polymer completely, and an insoluble matter was removed through filtration to obtain a measurement sample for GPC.

Specifically, the measurement method was as follows. First, a calibration curve was prepared by using 9 standard polystyrene samples having different known molecular weights. The highest weight average molecular weight Mw among the standard polystyrenes used was 1090000, and the lowest weight average molecular weight Mw among them was 1050. Subsequently, a measurement sample was prepared with a block copolymer (a) to be measured for molecular weight, in the manner as described above.

After confirming that the temperature in a chamber containing columns became constant, a solution sample was injected to initiate the measurement. After the measurement, the molecular weight distribution curve obtained was statistically processed, and the weight average molecular weight Mw and the number average molecular weight Mn were calculated. The molecular weight distribution was obtained by dividing the weight average molecular weight Mw by the number average molecular weight Mn. The number of molecular weight peaks was determined from the molecular weight distribution curve.

<Proportion (%) of Vinyl Monomer Included in Polymer Block (S) of Block Copolymer (a)>

First, the styrene content was measured with a UV meter in accordance with the above-described procedure, and then the content of styrene included in the polymer block was measured. Specifically, about 50 mg of a polymer accurately weighed was dissolved in about 10 mL of chloroform, and an osmic acid solution was added thereto to decompose the conjugated diene portion, and the polymer solution after the decomposition was gradually added dropwise into about 200 mL of methanol. This allowed a polymer block styrene component which was not dissolved in methanol to precipitate. The precipitated component was the polymer block (S), and a styrene monomer which was not forming a block and styrene having a low degree of polymerization were dissolved in a methanol/chloroform mixed solution. The precipitated polymer was filtered out, and dried in vacuum, and the amount of block styrene was obtained by weighing the block styrene as the residue. For the proportion of the vinyl monomer included in the polymer block (S), a value obtained by dividing the amount of block styrene by the total amount of styrene was used.

<Weight Average Molecular Weight Mw, Number Average Molecular Weight Mn, and Molecular Weight Distribution Mw/Mn of Polymer Block (S) of Block Copolymer (a)>

The precipitated polymer block (S) obtained in the above measurement for the percentage of the polymer block (S) was redissolved and measurement was performed with a GPC apparatus. The measurement conditions and method were the same as those in the measurement for the molecular weight of a block copolymer (a).

<Temperature at Tan δ Peak of Dynamic Viscoelasticity of Block Copolymer (a)>

A strip-shaped test piece having a thickness of 2 mm was prepared by using compression molding, and the dynamic viscoelasticity of the test piece was measured with a rheospectorer DVE-V4FT manufactured by Rheology Co., Ltd. in a tensile mode at a frequency of 35 Hz and a temperature elevation rate of 3° C./min, in a temperature range from −110° C. to a normal temperature such that a temperature at a tan δ peak could be found.

<Melt Flow Rate of Block Copolymer (a)>

The melt flow rate was measured at a temperature of 200° C. and a load of 5 kgf in accordance with ISO 1133.

<Refractive Index of Block Copolymer (a)>

A film having a thickness of about 0.4 mm was prepared with each of the block copolymers (a) by using a compression molding machine. The film was subjected to an environment in which the air temperature was 23° C. and the humidity was 50% for 24 hours, and thereafter the refractive index of the film was measured with an Abbe refractometer manufactured by ATAGO CO., LTD. at a measurement wavelength of 589 nm in accordance with JIS K7142: 2008 "Plastics Determination of refractive index".

<Solubility Parameter Value (δa) of Block Copolymer (a)>

The content in % by mass of the vinyl aromatic monomer unit (styrene) and the content in % by mass of the conjugated diene monomer unit (butadiene) of each of the block copolymers (a) were converted to mol % on the basis of the molecular weights of the monomers, and the solubility parameter value (δa) of each of the block copolymers (a) was calculated as described in the following.

The solubility parameter value was calculated from the cohesive energy E (J/mol) and molar volume V ($10^{-6}$ m$^3$/mol) of the vinyl polymer in accordance with a method described by Bicerano (document: J. Bicerano, Prediction of Polymer Properties, 3rd, Marcel Dekker, 2002). For the cohesive energy, a value calculated in accordance with a Van Krevelen method was used.

The E/V of the vinyl polymers used for calculation was as follows:
Polystyrene: 36932/97.0
1,2-Polybutadiene: 16450/58.3
1,4-Polybutadiene: 18579/59.1
1,4-Polyisoprene: 22644/76.6
Polyacrylonitrile: 27180/45.1

Calculation of a solubility parameter value was conducted only on the basis of the content (proportion) of the monomer unit in the polymer, and the block structure and microphase-separated structure of a block copolymer (a), and the crystallinity of the polymer were not taken into account. Specifically, the cohesive energy E (J/mol) and molar volume V ($10^{-6}$ m$^3$/mol) were determined by using the following equations only on the basis of the content of the monomer unit in a block copolymer (a), and $(E/V)^{0.5}$ calculated was used for the solubility parameter value.

Cohesive energy $E$ of block copolymer $(a)$=($E$ of conjugated diene monomer unit×content of conjugated diene monomer unit)+($E$ of vinyl aromatic monomer unit×content of vinyl aromatic monomer unit)

Molar volume $V$ of block copolymer $(a)$=($V$ of conjugated diene monomer unit×content ratio of conjugated diene monomer unit)+($V$ of vinyl aromatic monomer unit×content ratio of vinyl aromatic monomer unit)

Solubility parameter: $(E/V)^{0.5}$=(cohesive energy $E$ of block copolymer $(a)$/molar volume $V$ of block copolymer $(a)$)$^{0.5}$

[Copolymer (b)]
(Copolymer (b)-1)

The copolymer (b)-1 was a styrene-acrylonitrile copolymer (SAN resin), and the styrene content was 80.2% by mass; the content of acrylonitrile was 19.8% by mass; and the weight average molecular weight (Mw), the number average molecular weight (Mn), and the molecular weight distribution (Mw/Mn) in GPC were 152000, 58000, and 2.62, respectively. The MFR (at 200° C., at a load of 5 kg) was 3.6.

(Copolymer (b)-2)

The copolymer (b)-2 was a styrene-acrylonitrile copolymer (SAN resin), and the styrene content was 79.5% by mass; the content of acrylonitrile was 20.5% by mass; and the weight average molecular weight (Mw), the number average molecular weight (Mn), and the molecular weight distribution (Mw/Mn) in GPC were 147000, 54000, and 2.72, respectively. The MFR (at 200° C., at a load of 5 kg) was 3.5.

(Copolymer (b)-3)

The copolymer (b)-3 was a styrene-acrylonitrile copolymer (SAN resin), and the styrene content was 75.8% by mass; the content of acrylonitrile was 24.2% by mass; and the weight average molecular weight (Mw), the number average molecular weight (Mn), and the molecular weight distribution (Mw/Mn) in GPC were 128000, 48000, and 2.64, respectively. The MFR (at 200° C., at a load of 5 kg) was 3.5.

(Copolymer (b)-4)

The copolymer (b)-4 was a styrene-acrylonitrile copolymer (SAN resin), and the styrene content was 74.5% by mass; the content of acrylonitrile was 25.5% by mass; and the weight average molecular weight (Mw), the number average molecular weight (Mn), and the molecular weight distribution (Mw/Mn) in GPC were 132000, 50000, and 2.64, respectively. The MFR (at 200° C., at a load of 5 kg) was 3.4.

(Copolymer (b)-5)

The copolymer (b)-5 was a styrene-acrylonitrile copolymer (SAN resin), and the styrene content was 73.9% by mass; the content of acrylonitrile was 26.1% by mass; and the weight average molecular weight (Mw), the number average molecular weight (Mn), and the molecular weight distribution (Mw/Mn) in GPC were 120000, 50000, and 2.40, respectively. The MFR (at 200° C., at a load of 5 kg) was 4.0.

(Copolymer (b)-6)

The copolymer (b)-6 was a styrene-acrylonitrile copolymer (SAN resin), and the styrene content was 70.1% by mass; the content of acrylonitrile was 29.9% by mass; and the weight average molecular weight (Mw), the number average molecular weight (Mn), and the molecular weight distribution (Mw/Mn) in GPC were 127000, 48000, and 2.65, respectively. The MFR (at 200° C., at a load of 5 kg) was 2.9.

(Copolymer (b)-7)

The copolymer (b)-7 was a styrene-acrylonitrile copolymer (SAN resin), and the styrene content was 69.7% by mass; the content of acrylonitrile was 30.3% by mass; and the weight average molecular weight (Mw), the number average molecular weight (Mn), and the molecular weight distribution (Mw/Mn) in GPC were 118000, 45000, and 2.64, respectively. The MFR (at 200° C., at a load of 5 kg) was 3.0.

(Copolymer (b)-8)

The copolymer (b)-8 was a styrene-acrylonitrile copolymer (SAN resin), and the styrene content was 63.2% by mass; the content of acrylonitrile was 36.8% by mass; and the weight average molecular weight (Mw), the number average molecular weight (Mn), and the molecular weight distribution (Mw/Mn) in GPC were 120000, 46000, and 2.61, respectively. The MFR (at 200° C., at a load of 5 kg) was 2.8.

(Copolymer (b)-9)

For Comparative Examples, a PSJ Polystyrene 685 manufactured by PS Japan Corporation was used for a styrene homopolymer resin (GPPS). The weight average molecular weight (Mw), the number average molecular weight (Mn), and the molecular weight distribution in GPC were 273000, 108000, and 2.53, respectively. The MFR (at 200° C., at a load of 5 kg) was 2.1. The styrene homopolymer resin (GPPS), which was a styrene homopolymer containing no unsaturated nitrile monomer, was referred to as copolymer (b)-9 in Examples.

The structures, compositions, and so on of the copolymers (b)-1 to 9 used in Examples and Comparative Examples are listed in the following Table 2.

TABLE 2

| Copolymer (b) | (b)-1 | (b)-2 | (b)-3 | (b)-4 | (b)-5 | (b)-6 | (b)-7 | (b)-8 | (b)-9 |
|---|---|---|---|---|---|---|---|---|---|
| Content of vinyl aromatic monomer unit (% by mass) | 80.2 | 79.5 | 75.8 | 74.5 | 73.9 | 70.1 | 69.7 | 63.2 | 100 |
| Content of unsaturated nitrile monomer unit (% by mass) | 19.8 | 20.5 | 24.2 | 25.5 | 26.1 | 29.9 | 30.3 | 36.8 | 0 |
| Weight average molecular weight Mw (10000×) | 15.2 | 14.7 | 12.8 | 13.2 | 12.0 | 12.7 | 11.8 | 12.0 | 27.3 |
| Number average molecular weight Mn (10000×) | 5.8 | 5.4 | 4.8 | 5.0 | 5.0 | 4.8 | 4.5 | 4.6 | 10.8 |
| Molecular weight distribution Mw/Mn | 2.62 | 2.72 | 2.64 | 2.64 | 2.40 | 2.65 | 2.64 | 2.61 | 2.53 |
| Melt flow rate* | 3.6 | 3.5 | 3.5 | 3.4 | 4.0 | 2.9 | 3.0 | 2.8 | 2.1 |
| Refractive index | 1.574 | 1.573 | 1.570 | 1.569 | 1.568 | 1.565 | 1.565 | 1.559 | 1.590 |
| Solubility parameter value (δb) | 20.53 | 20.57 | 20.76 | 20.82 | 20.85 | 21.05 | 21.07 | 21.40 | 19.52 |

*Conditions: 200° C., 5 kg

The structure of a copolymer (b) listed in the above Table 2 was determined in accordance with the following method.

<Content (% by Mass) of Unsaturated Nitrile Monomer Unit>

The content of the unsaturated nitrile monomer unit (acrylonitrile) was determined in proton NMR measurement. From a spectrum obtained under the following conditions, a ratio of an integrated value in the high-magnetic field side (1.0 to 3.0 ppm) derived from a methine group and a methylene group to an integrated value in the low-magnetic field side (6.2 to 7.5 ppm) derived from the phenyl ring of styrene was calculated. From the ratio obtained, a mole ratio between styrene and acrylonitrile in the copolymer was calculated, and the content (% by mass) of acrylonitrile was determined on the basis of the molecular weights of the monomer units. A peak derived from deuterated DMSO appears at approximately 2.5 ppm, the contribution of the peak was not taken into account in calculation of an integrated value.

Apparatus: JEOL-ECA500
Deuterated solvent: deuterated DMSO
Number of scans: 256
Temperature: room temperature <Weight Average Molecular Weight Mw, Number Average Molecular Weight Mn, Molecular Weight Distribution Mw/Mn, and Number of Molecular Weight Peaks of Copolymer (b)>

The weight average molecular weight Mw, number average molecular weight Mn, molecular weight distribution Mw/Mn, and the number of molecular weight peaks of a copolymer (b) were measured with GPC under the following measurement conditions.

GPC apparatus: HLC-8220 manufactured by Tosoh Corporation

Column: two SuperMultiporeHZ-M connected in series, manufactured by Tosoh Corporation Column temperature: 40° C.

Feeding rate: 0.2 mL/min Detector: refractometer (RI)

To 50 mg of a polymer to be measured for molecular weight, 10 mL of tetrahydrofuran as a solvent was added to dissolve the polymer completely, and an insoluble matter was removed through filtration to obtain a measurement sample.

Specifically, the measurement method was as follows. First, a calibration curve was prepared by using 9 standard polystyrene samples having different known molecular weights. The highest weight average molecular weight Mw among the standard polystyrenes used was 1090000, and the lowest weight average molecular weight Mw among them was 1050.

Subsequently, a measurement sample was prepared with a copolymer (b) to be measured for molecular weight, in the manner as described above. After confirming that the temperature in a chamber containing columns became constant, a solution sample was injected to initiate the measurement. After the measurement, the molecular weight distribution curve obtained was statistically processed, and the weight average molecular weight Mw and the number average molecular weight Mn were calculated. The molecular weight distribution was obtained by dividing the weight average molecular weight Mw by the number average molecular weight Mn. The number of molecular weight peaks was determined from the molecular weight distribution curve.

<Melt Flow Rate of Copolymer (b)>

The melt flow rate was measured at a temperature of 200° C. and a load of 5 kgf in accordance with ISO 1133.

<Refractive Index of Copolymer (b)>

A film having a thickness of about 0.2 mm was prepared with each of the copolymers (b) by using a compression molding machine. The film was subjected to an environment in which the air temperature was 23° C. and the humidity was 50% for 24 hours, and thereafter the refractive index of the film was measured with an Abbe refractometer manufactured by ATAGO CO., LTD. at a measurement wavelength of 589 nm in accordance with JIS K7142: 2008 "Plastics Determination of refractive index".

<Solubility Parameter Value (δb) of Copolymer (b)>

The content in % by mass of the vinyl aromatic monomer (styrene) and the content in % by mass of the unsaturated nitrile monomer (acrylonitrile) of each of the copolymers (b) were converted to mol % on the basis of the molecular weights of the monomers, and the solubility parameter value (δb) of each of the copolymers (b) was calculated in the same manner as in the case of a block copolymer (a).

Examples 1 to 49, and Comparative Examples 1 to 7

After dry-blending pellets of a block copolymer (a) and a copolymer (b) produced as described above at a predetermined blending ratio listed in the following Table 3 and Table 4, without melt-kneading with an extruder, a test piece was prepared directly from the dry blend with an injection molding machine, and evaluation was performed.

For the injection molding machine, the hydraulic injection molding machine FE120 (maximum clamping pressure: 120 t) manufactured by NISSEI PLASTIC INDUSTRIAL CO., LTD. was used, and injection molding was carried out at a cylinder temperature of 220° C. and a mold temperature of 40° C.

Regarding the shape of the test piece, a test piece of a mirror-surface plate having a width of 50 mm, a length of 90 mm, and a thickness of 2 mm, and a strip-shaped test piece having a thickness of 3.2 mm and a width of 12.7 mm in accordance with ASTM were formed. The gate for the test piece of a mirror-surface plate was a tab gate having a thickness of 1.8 mm at a center thick portion in the width direction.

The test piece of a mirror-surface plate was used to evaluate the appearance when molded and scratch resistance, and the strip-shaped test piece in accordance with ASTM was used to evaluate the impact resistance in an Izod impact test.

In Examples 36 and 37, in which the components used and the ratio among them were those in Examples 17 and 19, respectively, dry-blending, melt-kneading, and injection molding were carried out in order. Specifically, melt-kneading was carried out with a twin-screw extruder having a screw diameter of 30 mm, L/D=42 (L: the distance (m) from the inlet for starting materials to the outlet in the extruder; D: the inner diameter (m) of the extruder), and a cylinder setting temperature of 220° C. to obtain a pellet of a thermoplastic resin composition, and the test pieces were prepared by using the above-described injection molding machine in the same manner as described in the above to evaluate the appearance when molded, the impact resistance, and the scratch resistance. The resin components in the resin composition were considered to be dispersed more homogeneously than in the test pieces in other Examples as a result of melt-kneading.

Comparison was performed for resin compositions containing the block copolymer (a)-8 or (a)-9, a resin composition containing the copolymer (b)-9, and the single copolymer (b)-4 in Comparative Examples. For a test piece prepared by using injection molding, evaluation was performed after conditioning at 23° C. for 24 hours.

(Appearance in Molded Product)

For evaluating the appearance when molded, the appearance of a test piece of a mirror-surface plate prepared by using injection molding was visually evaluated. For a test piece with a flow mark generated, a concentric wave pattern centered at the gate was found.

No flow marks were found: ⊙

A slight flow mark was found in a part of the plate: ○

A clear flow mark was found: x (Izod Impact Strength—with or without Notch)

A strip-shaped molded article having a thickness of about 3.2 mm and a width of 12.7 mm in accordance with the test standard ASTM D256 was formed by using injection molding, and the strip-shaped molded article obtained was cut into a length of 64 mm to obtain test pieces, and some of them were notched. Measurement was performed for both of the test pieces obtained with or without a notch. An average value of 6 measurements was calculated. For Examples in which the strength was so high that the test piece was not broken and the strength could not be measured accurately, "N.B." (Non Break) was assigned in Tables for Examples.

(Scratch Resistance)

The above test piece of a mirror-surface plate prepared by using injection molding in accordance with the test standard ISO 15184 was subjected to a pencil scratch test at a load of 50 g, and the highest pencil hardness for which no scratches were generated was used to determine the scratch resistance. The test was repeated twice, and when the results of the two tests were different, the test was carried out again to find out a border line between the hardness which allowed a scratch to be generated and the hardness which allowed no scratches to be generated. The hardness of a common general-purpose polystyrene (GPPS) was about HB, and the hardness of each single block copolymer (a) according to the present invention was lower than 6B (a scratch was generated even in the case of 6B).

2B or higher: ⊙
3B to 4B: ○
5B to 6B: Δ
Lower than 6B: x (Difference in Refractive Index)

For each of the block copolymers (a) and the copolymers (b) used in Examples, the refractive index was measured with the above-described Abbe refractometer, and difference between the respective indexes na and nb was calculated, and the difference was evaluated by using the following evaluation criteria. The results are listed in Table 3 and Table 4.

$-0.005 \leq na-nb \leq 0.005$: ⊙ having an excellent transparency $-0.010 \leq na-nb \leq 0.008$: ○: having transparency (excluding the range of $-0.005 \leq na-nb \leq 0.005$)

Out of the above ranges: x: having a milky white color, or having cloudiness or opacity (Difference in Solubility Parameter Value)

Difference in a solubility parameter value between the component (a) and the component (b) ($\delta b - \delta a$) was calculated, and evaluated by using the following evaluation criteria. The results are listed in Table 3 and Table 4.

$1.7 \leq \delta b - \delta a \leq 2.0$: ⊙+: excellent in balance between transparency and scratch resistance $1.5 \leq \delta b - \delta a \leq 2.1$: ⊙: quite satisfactory in balance between transparency and scratch resistance (excluding the range of $1.7 \leq \delta b - \delta a \leq 2.0$)

$1.0 \leq \delta b - \delta a \leq 2.3$: ○: satisfactory in balance between transparency and scratch resistance (excluding the range of $1.5 \leq \delta b - \delta a \leq 2.1$)

Out of the above ranges: x: poor in at least one of transparency and scratch resistance (Haze Value)

Each of the resin compositions in Examples and Comparative Examples was molded into a test piece of a mirror-surface plate having a thickness of 2 mm in accordance with the test standard ISO 14782 by using injection molding. The haze value of the test piece obtained was measured with a haze computer HZ-1 manufactured by Suga Test Instruments Co., Ltd.

The ratings for the measurement results of a haze value were as follows:

3% or lower: ⊙+: having excellent transparency.

Higher than 3% and 6% or lower: ⊙: having transparency and with no problems in practical use.

Higher than 6% and 15% or lower: ○: having a slight cloudiness but with no problems in transparency in practical use.

Higher than 15% and 30% or lower: Δ: having a milky white color, or semi-transparency with cloudiness.

Higher than 30%: x: having opacity.

TABLE 3

| | | Block co-polymer (a) | Co-polymer (b) | Izod impact strength (J/m) With notch | Izod impact strength (J/m) Without notch | Appearance in molded product | Scratch resistance Hardness | Scratch resistance Rating | Difference in refractive index na-nb Value | Difference in refractive index na-nb Rating | 7.00*Ma −8.62*Mb | Difference in solubility parameter value δb−δa Value | Difference in solubility parameter value δb−δa Rating | Haze value % | Haze value Rating |
|---|---|---|---|---|---|---|---|---|---|---|---|---|---|---|---|
| Example 1 | Polymer species Blending ratio (% by mass) | (a)-1 35 | (b)-1 65 | 27 | 250 | ⊙ | B | ⊙ | −0.001 | ⊙ | 4.3 | 1.53 | ⊙ | 3.5 | ⊙ |
| Example 2 | Polymer species Blending ratio (% by mass) | (a)-1 50 | (b)-1 50 | 45 | 640 | ⊙ | 5B | Δ | −0.001 | ⊙ | 4.3 | 1.53 | ⊙ | 5.0 | ⊙ |
| Example 3 | Polymer species Blending ratio (% by mass) | (a)-1 60 | (b)-1 40 | 210 | N.B. | ⊙ | <6B | X | −0.001 | ⊙ | 4.3 | 1.53 | ⊙ | 4.0 | ⊙ |
| Example 4 | Polymer species Blending ratio (% by mass) | (a)-1 35 | (b)-2 65 | 26 | 240 | ⊙ | 2B | ⊙ | 0.000 | ⊙ | −1.7 | 1.57 | ⊙ | 1.2 | ⊙+ |
| Example 5 | Polymer species Blending ratio (% by mass) | (a)-1 50 | (b)-2 50 | 44 | 620 | ⊙ | 6B | Δ | 0.000 | ⊙ | −1.7 | 1.57 | ⊙ | 1.5 | ⊙+ |
| Example 6 | Polymer species Blending ratio (% by mass) | (a)-1 60 | (b)-2 40 | 203 | N.B. | ⊙ | <6B | X | 0.000 | ⊙ | −1.7 | 1.57 | ⊙ | 1.3 | ⊙+ |
| Example 7 | Polymer species Blending ratio (% by mass) | (a)-1 35 | (b)-3 65 | 25 | 480 | ⊙ | B | ⊙ | 0.003 | ⊙ | −33.6 | 1.76 | ⊙+ | 9.0 | ○ |
| Example 8 | Polymer species Blending ratio (% by mass) | (a)-1 50 | (b)-3 50 | 41 | 750 | ⊙ | 4B | ○ | 0.003 | ⊙ | −33.6 | 1.76 | ⊙+ | 13 | ○ |
| Example 9 | Polymer species Blending ratio (% by mass) | (a)-1 60 | (b)-3 40 | 52 | N.B. | ⊙ | <6B | X | 0.003 | ⊙ | −33.6 | 1.76 | ⊙+ | 12 | ○ |
| Example 10 | Polymer species Blending ratio (% by mass) | (a)-1 35 | (b)-4 65 | 29 | 510 | ⊙ | B | ⊙ | 0.004 | ⊙ | −44.8 | 1.82 | ⊙+ | 24 | Δ |

TABLE 3-continued

| | | Block co-polymer (a) | Co-polymer (b) | Izod impact strength (J/m) With notch | Izod impact strength (J/m) Without notch | Appearance in molded product | Scratch resistance Hardness | Scratch resistance Rating | Difference in refractive index na-nb Value | Difference in refractive index na-nb Rating | 7.00*Ma −8.62*Mb | Difference in solubility parameter value δb-δa Value | Difference in solubility parameter value δb-δa Rating | Haze value % | Haze value Rating |
|---|---|---|---|---|---|---|---|---|---|---|---|---|---|---|---|
| Example 11 | Polymer species<br>Blending ratio (% by mass) | (a)-1<br>35 | (b)-5<br>65 | 28 | 460 | ◎ | B | ◎ | 0.005 | ◎ | −50.0 | 1.85 | ◎+ | 28 | Δ |
| Example 12 | Polymer species<br>Blending ratio (% by mass) | (a)-1<br>60 | (b)-5<br>40 | 43 | N.B. | ◎ | <6B | X | 0.005 | ◎ | −50.0 | 1.85 | ◎+ | 27 | Δ |
| Example 13 | Polymer species<br>Blending ratio (% by mass) | (a)-1<br>35 | (b)-6<br>65 | 30 | 520 | ◎ | B | ◎ | 0.008 | ○ | −82.7 | 2.05 | ◎ | 30 | Δ |
| Example 14 | Polymer species<br>Blending ratio (% by mass) | (a)-2<br>35 | (b)-2<br>65 | 24 | 450 | ◎ | 2B | ◎ | 0.000 | ◎ | 1.4 | 1.86 | ◎+ | 1.2 | ◎+ |
| Example 15 | Polymer species<br>Blending ratio (% by mass) | (a)-2<br>50 | (b)-2<br>50 | 39 | 690 | ◎ | 4B | ○ | 0.000 | ◎ | 1.4 | 1.86 | ◎+ | 1.5 | ◎+ |
| Example 16 | Polymer species<br>Blending ratio (% by mass) | (a)-2<br>65 | (b)-2<br>35 | 48 | N.B. | ◎ | <6B | X | 0.000 | ◎ | 1.4 | 1.86 | ◎+ | 1.6 | ◎+ |
| Example 17 | Polymer species<br>Blending ratio (% by mass) | (a)-2<br>35 | (b)-4<br>65 | 25 | 480 | ◎ | B | ◎ | 0.001 | ◎ | −9.8 | 1.92 | ◎+ | 4.0 | ◎ |
| Example 18 | Polymer species<br>Blending ratio (% by mass) | (a)-2<br>50 | (b)-4<br>50 | 41 | 750 | ◎ | 5B | Δ | 0.001 | ◎ | −9.8 | 1.92 | ◎+ | 5.0 | ◎ |
| Example 19 | Polymer species<br>Blending ratio (% by mass) | (a)-2<br>60 | (b)-4<br>40 | 52 | N.B. | ◎ | <6B | X | 0.001 | ◎ | −9.8 | 1.92 | ◎+ | 4.5 | ◎ |
| Example 20 | Polymer species<br>Blending ratio (% by mass) | (a)-2<br>35 | (b)-6<br>65 | 25 | 520 | ◎ | B | ◎ | 0.005 | ◎ | −47.7 | 2.15 | ◎ | 13.0 | ○ |
| Example 21 | Polymer species<br>Blending ratio (% by mass) | (a)-2<br>60 | (b)-6<br>40 | 42 | N.B. | ◎ | <6B | X | 0.005 | ◎ | −47.7 | 2.15 | ◎ | 14.0 | ○ |
| Example 22 | Polymer species<br>Blending ratio (% by mass) | (a)-2<br>35 | (b)-4<br>65 | 30 | 560 | ◎ | 2B | ◎ | 0.005 | ◎ | −51.2 | 2.17 | ○ | 29 | Δ |
| Example 23 | Polymer species<br>Blending ratio (% by mass) | (a)-2<br>35 | (b)-8<br>65 | 24 | 770 | ◎ | B | ◎ | 0.011 | X | −107.2 | 2.50 | X | 40 | X |
| Example 24 | Polymer species<br>Blending ratio (% by mass) | (a)-2<br>60 | (b)-8<br>40 | 38 | N.B. | ◎ | <6B | X | 0.011 | X | −107.2 | 2.50 | X | 38 | X |
| Example 25 | Polymer species<br>Blending ratio (% by mass) | (a)-3<br>35 | (b)-1<br>65 | 23 | 210 | ◎ | B | ◎ | 0.001 | ◎ | −9.7 | 1.49 | ○ | 2.5 | ◎+ |
| Example 26 | Polymer species<br>Blending ratio (% by mass) | (a)-3<br>60 | (b)-1<br>40 | 90 | 750 | ◎ | <6B | X | 0.001 | ◎ | −9.7 | 1.49 | ○ | 3.0 | ◎+ |
| Example 27 | Polymer species<br>Blending ratio (% by mass) | (a)-3<br>35 | (b)-2<br>65 | 26 | 450 | ◎ | 2B | ◎ | 0.002 | ◎ | −15.7 | 1.53 | ◎ | 9.0 | ○ |
| Example 28 | Polymer species<br>Blending ratio (% by mass) | (a)-3<br>35 | (b)-3<br>65 | 25 | 300 | ◎ | B | ◎ | 0.005 | ◎ | −47.6 | 1.72 | ◎+ | 18 | Δ |
| Example 29 | Polymer species<br>Blending ratio (% by mass) | (a)-3<br>35 | (b)-4<br>65 | 24 | 220 | ◎ | B | ◎ | 0.006 | ○ | −58.8 | 1.78 | ◎+ | 22 | Δ |
| Example 30 | Polymer species<br>Blending ratio (% by mass) | (a)-3<br>60 | (b)-4<br>40 | 38 | 640 | ◎ | <6B | X | 0.006 | ○ | −58.8 | 1.78 | ◎+ | 23 | Δ |
| Example 31 | Polymer species<br>Blending ratio (% by mass) | (a)-3<br>35 | (b)-5<br>65 | 25 | 430 | ◎ | 2B | ◎ | 0.007 | ○ | −64.0 | 1.81 | ◎+ | 28 | Δ |
| Example 32 | Polymer species<br>Blending ratio (% by mass) | (a)-4<br>35 | (b)-3<br>65 | 21 | 220 | ◎ | 4B | ○ | −0.006 | ○ | 57.4 | 1.93 | ◎+ | 15 | ○ |
| Example 33 | Polymer species<br>Blending ratio (% by mass) | (a)-4<br>60 | (b)-3<br>40 | 35 | 720 | ◎ | <6B | X | −0.006 | ○ | 57.4 | 1.93 | ◎+ | 18 | Δ |

TABLE 3-continued

| | | Block co-polymer (a) | Co-polymer (b) | Izod impact strength (J/m) With notch | Izod impact strength (J/m) Without notch | Appearance in molded product | Scratch resistance Hardness | Scratch resistance Rating | Difference in refractive index na-nb Value | Difference in refractive index na-nb Rating | 7.00*Ma −8.62*Mb | Difference in solubility parameter value δb-δa Value | Difference in solubility parameter value δb-δa Rating | Haze value % | Haze value Rating |
|---|---|---|---|---|---|---|---|---|---|---|---|---|---|---|---|
| Example 34 | Polymer species Blending ratio (% by mass) | (a)-4 35 | (b)-4 65 | 30 | 580 | ◎ | 2B | ◎ | −0.005 | ◎ | 46.2 | 1.99 | ◎+ | 14 | ○ |
| Example 35 | Polymer species Blending ratio (% by mass) | (a)-4 60 | (b)-4 40 | 56 | N.B. | ◎ | <6B | X | −0.005 | ◎ | 46.2 | 1.99 | ◎+ | 13 | ○ |
| Example 36 | Polymer species Blending ratio (% by mass) | (a)-2 35 | (b)-4 65 | 25 | 470 | ◎ | B | ◎ | 0.001 | ◎ | −9.8 | 1.92 | ◎+ | 4.0 | ◎ |
| Example 37 | Polymer species Blending ratio (% by mass) | (a)-2 60 | (b)-4 40 | 52 | N.B. | ◎ | <6B | X | 0.001 | ◎ | −9.8 | 1.92 | ◎+ | 4.5 | ◎ |

*N.B. refers to the Izod impact strength in the case of no braking.

TABLE 4

| | | Block co-polymer (a) | Co-polymer (b) | Izod impact strength (J/m) With notch | Izod impact strength (J/m) Without notch | Appearance in molded product | Scratch resistance Hardness | Scratch resistance Rating | Difference in refractive index na-nb Value | Difference in refractive index na-nb Rating | 7.00*Ma −8.62*Mb | Difference in solubility parameter value δb-δa Value | Difference in solubility parameter value δb-δa Rating | Haze value % | Haze value Rating |
|---|---|---|---|---|---|---|---|---|---|---|---|---|---|---|---|
| Example 38 | Polymer species Blending ratio (% by mass) | (a)-5 35 | (b)-3 65 | 21 | 390 | ○ | 2B | ◎ | 0.000 | ◎ | 1.4 | 1.86 | ◎+ | 1.5 | ◎+ |
| Example 39 | Polymer species Blending ratio (% by mass) | (a)-5 60 | (b)-3 40 | 44 | N.B. | ○ | <6B | X | 0.000 | ◎ | 1.4 | 1.86 | ◎+ | 2.1 | ◎+ |
| Example 40 | Polymer species Blending ratio (% by mass) | (a)-5 35 | (b)-4 65 | 24 | 410 | ○ | B | ◎ | 0.001 | ◎ | −9.8 | 1.92 | ◎+ | 6.0 | ◎ |
| Example 41 | Polymer species Blending ratio (% by mass) | (a)-5 60 | (b)-4 40 | 50 | N.B. | ○ | <6B | X | 0.001 | ◎ | −9.8 | 1.92 | ◎+ | 5.5 | ◎ |
| Example 42 | Polymer species Blending ratio (% by mass) | (a)-6 35 | (b)-3 65 | 16 | 180 | ○ | B | ◎ | 0.005 | ◎ | −47.6 | 1.72 | ◎+ | 17 | Δ |
| Example 43 | Polymer species Blending ratio (% by mass) | (a)-6 60 | (b)-3 35 | 35 | 390 | ○ | <6B | X | 0.005 | ◎ | −47.6 | 1.72 | ◎+ | 19 | Δ |
| Example 44 | Polymer species Blending ratio (% by mass) | (a)-6 35 | (b)-4 60 | 17 | 180 | ○ | B | ◎ | 0.006 | ○ | −58.8 | 1.78 | ◎+ | 26 | Δ |
| Example 45 | Polymer species Blending ratio (% by mass) | (a)-6 60 | (b)-4 40 | 35 | 400 | ○ | <6B | X | 0.006 | ○ | −58.8 | 1.78 | ◎+ | 25 | Δ |
| Example 46 | Polymer species Blending ratio (% by mass) | (a)-7 35 | (b)-3 65 | 18 | 190 | ○ | 6B | X | 0.000 | ◎ | 1.4 | 1.86 | ◎+ | 2.6 | ◎+ |
| Example 47 | Polymer species Blending ratio (% by mass) | (a)-7 60 | (b)-3 40 | 33 | 500 | ○ | <6B | X | 0.000 | ◎ | 1.4 | 1.86 | ◎+ | 2.3 | ◎+ |
| Example 48 | Polymer species Blending ratio (% by mass) | (a)-7 35 | (b)-4 65 | 18 | 190 | ○ | 3B | ○ | 0.001 | ◎ | −9.8 | 1.92 | ◎+ | 8.0 | ○ |
| Example 49 | Polymer species Blending ratio (% by mass) | (a)-7 60 | (b)-4 40 | 40 | 500 | ○ | <6B | X | 0.001 | ◎ | −9.8 | 1.92 | ◎+ | 7.5 | ○ |

TABLE 4-continued

| | | Block co-polymer (a) | Co-polymer (b) | Izod impact strength (J/m) With notch | Izod impact strength (J/m) Without notch | Appearance in molded product | Scratch resistance Hardness | Scratch resistance Rating | Difference in refractive index na-nb Value | Difference in refractive index Rating | 7.00*Ma -8.62*Mb | Difference in solubility parameter value δb-δa Value | Difference in solubility parameter value Rating | Haze value % | Haze value Rating |
|---|---|---|---|---|---|---|---|---|---|---|---|---|---|---|---|
| Comparative Example 1 | Polymer species Blending ratio (% by mass) | (a)-8 35 | (b)-4 65 | 25 | 470 | X | B | ◎ | 0.001 | ◎ | −9.8 | 1.92 | ◎+ | 9.5 | ○ |
| Comparative Example 2 | Polymer species Blending ratio (% by mass) | (a)-8 60 | (b)-4 40 | 52 | N.B. | X | <6B | X | 0.001 | ◎ | −9.8 | 1.92 | ◎+ | 9.0 | ○ |
| Comparative Example 3 | Polymer species Blending ratio (% by mass) | (a)-9 35 | (b)-4 65 | 32 | 400 | X | 3B | ○ | −0.019 | X | 200.2 | 2.49 | X | 90 | X |
| Comparative Example 4 | Polymer species Blending ratio (% by mass) | (a)-9 60 | (b)-4 40 | 46 | N.B. | X | <6B | X | −0.019 | X | 200.2 | 2.49 | X | 90 | X |
| Comparative Example 5 | Polymer species Blending ratio (% by mass) | (a)-2 35 | (b)-9 65 | 12 | 160 | X | <6B | X | −0.020 | X | 210.0 | 0.62 | X | 12 | ○ |
| Comparative Example 6 | Polymer species Blending ratio (% by mass) | (a)-2 60 | (b)-9 40 | 11 | 190 | X | <6B | X | −0.020 | X | 210.0 | 0.62 | X | 11 | ○ |
| Comparative Example 7 | Polymer species Blending ratio (% by mass) | — — | (b)-4 100 | 13 | 100 | ◎ | HB | ◎ | — | — | — | — | — | 1.0 | ◎+ |

*N.B. refers to the Izod impact strength in the case of no braking

It can be seen that no flow marks were found in the appearance of each of the thermoplastic resin compositions in Examples 1 to 37, and each of the thermoplastic resin compositions in Examples 38 to 49, although a slight flow mark was found in a part of the plate, exhibited a quite satisfactory appearance when molded, and exhibited an Izod impact strength higher than that of the single copolymer (b)-2 in Comparative Example 7.

In addition, it can be seen that either a feature to exhibit a higher Izod impact strength or a feature to exhibit scratch resistance with the impact strength retained was exerted depending on the composition ratio between a block copolymer (a) and a copolymer (b).

On the other hand, a clear flow mark was found for each of the thermoplastic resin compositions in Comparative Examples 1 to 6 and as a result the appearance of a molded product was significantly deteriorated. In addition, it can be seen that the resin composition in Comparative Example 7 was extremely poor in an impact strength-improving effect and had a poor evaluation result, and as a result, did not have sufficient characteristics for practical use.

The present application is based on a Japanese patent application (Japanese Patent Application No. 2014-030861) filed in the Japan Patent Office on 20 Feb. 2014 and a Japanese patent application (Japanese Patent Application No. 2014-030864) filed in the Japan Patent Office on 20 Feb. 2014, the contents of which are incorporated by reference herein.

INDUSTRIAL APPLICABILITY

The thermoplastic resin composition according to the present invention has industrial applicability as a thermoplastic resin composition having good appearance when molded and excellent impact resistance in a wide variety of applications including various resin products for housings or covers of home appliances and office automation equipment, medical devices, containers, toys, musical instruments, and daily necessities.

The invention claimed is:
1. An injection molded product comprising:
   a block copolymer (a) comprising 60 to 80% by mass of a vinyl aromatic monomer unit and 40 to 20% by mass of a conjugated diene monomer unit, wherein the block copolymer (a) comprises at least one random copolymer block (B/S) comprising a vinyl aromatic monomer unit and a conjugated diene monomer unit; and
   a copolymer (b) comprising 60 to 90% by mass of a vinyl aromatic monomer unit and 40 to 10% by mass of an unsaturated nitrile monomer unit,
   wherein the block copolymer (a) has at least one polymer block (S) comprising 50 to 85% by mass of a vinyl aromatic monomer unit,
   the block copolymer (a) has at least one tan δ peak of dynamic viscoelasticity at a temperature in a range of −73 to −20° C.,
   a mass ratio (a)/(b) of the block copolymer (a) to the copolymer (b) is 1/99 to 80/20, and a molecular weight distribution (Mw/Mn) of the polymer block (S) is 1.3 to 4.0.

2. The injection molded product according to claim 1, wherein the block copolymer (a) comprises at least two blocks of the polymer block (S).

3. The injection molded product according to claim 1, wherein
a proportion of the vinyl aromatic monomer unit included in the polymer block (S) is 50 to 90% by mass based on a total amount of the vinyl aromatic monomer unit in the block copolymer (a), and
a number average molecular weight (Mn) of the polymer block (S) is 10000 to 60000.

4. The injection molded product according to claim 1, wherein a refractive index (na) of the block copolymer (a) and a refractive index (nb) of the copolymer (b) satisfy the following relation (1):

$$-0.010 \leq na-nb \leq 0.008 \qquad (1).$$

5. The injection molded product according to claim 1, wherein a content Ma (% by mass) of the conjugated diene monomer unit in the block copolymer (a) and a content Mb (% by mass) of the unsaturated nitrile monomer unit in the copolymer (b) satisfy the following relation (2):

$$-50 \leq 7.00 \times Ma - 8.62 \times Mb \leq 50 \qquad (2).$$

6. The injection molded product according to claim 1, wherein a solubility parameter value $\delta a$ of the block copolymer (a) and a solubility parameter value $\delta b$ of the copolymer (b) satisfy the following relation (3):

$$1.0 \leq \delta b - \delta a \leq 2.3 \qquad (3).$$

7. The injection molded product according to claim 1, wherein a mass ratio (a)/(b) of the block copolymer (a) to the copolymer (b) is 1/99 to 65/35.

8. The injection molded product according to claim 1, wherein a mass ratio (a)/(b) of the block copolymer (a) to the copolymer (b) is 1/99 to 50/50.

9. The injection molded product according to claim 3, wherein
a proportion of the vinyl aromatic monomer unit included in the polymer block (S) is 50 to 90% by mass based on a total amount of the vinyl aromatic monomer unit in the block copolymer (a), and
a number average molecular weight (Mn) of the polymer block (S) is 10000 to 60000.

10. The injection molded product according to claim 1, wherein the thermoplastic resin composition has 30% or less of a Haze value.

* * * * *